United States Patent
Ekler et al.

(10) Patent No.: US 12,476,783 B1
(45) Date of Patent: Nov. 18, 2025

(54) PROPAGATION DELAY COMPENSATION IN DAISY-CHAIN TOPOLOGIES

(71) Applicant: Infineon Technologies AG, Neubiberg (DE)

(72) Inventors: Markus Ekler, Feldkirchen (DE); Alexis Schindler, Unterhaching (DE); Andre Mourrier, Manosque (FR); Christian Walther, Munich (DE)

(73) Assignee: Infineon Technologies AG, Neubiberg (DE)

( * ) Notice: Subject to any disclaimer, the term of this patent is extended or adjusted under 35 U.S.C. 154(b) by 2 days.

(21) Appl. No.: 18/665,059

(22) Filed: May 15, 2024

(51) Int. Cl.
*H04L 7/00* (2006.01)
*H04L 67/12* (2022.01)

(52) U.S. Cl.
CPC ............ *H04L 7/0041* (2013.01); *H04L 67/12* (2013.01)

(58) Field of Classification Search
CPC .......... G06F 9/54; G06F 15/173; G06F 21/60; G06F 21/62; H03K 5/00; H04B 1/00; H04B 1/04; H04L 7/00; H04L 7/0041; H04L 12/26; H04L 12/46; H04L 12/50; H04L 29/06; H04L 29/08

USPC ............... 370/375; 375/354; 719/313; 726/1
See application file for complete search history.

(56) References Cited

U.S. PATENT DOCUMENTS

| | | | | |
|---|---|---|---|---|
| 2009/0279540 A1* | 11/2009 | Van Wageningen | .. | H04J 3/0694 370/375 |
| 2015/0020152 A1* | 1/2015 | Litichever | ............... | G06F 21/85 726/1 |
| 2025/0080095 A1* | 3/2025 | Healy | ................... | H02J 7/0013 |

* cited by examiner

*Primary Examiner* — Shawkat M Ali
(74) *Attorney, Agent, or Firm* — Billion & Armitage

(57) ABSTRACT

A main controller is coupled with a first cluster coupled with a second cluster in a daisy chain. The main controller is configured to determine a measured delay time associated with a first cluster coupled with a second cluster in a daisy chain topology, and determine a propagation delay associated with the first cluster based on the measured delay time. The main controller is further configured to generate a message to the second cluster which includes a command to be executed by the second cluster, and send the message, through an isolated interface of the main controller, to the second cluster based on the determined propagation delay to execute the command to actuate the second cluster synchronized to a switching clock of the main controller.

48 Claims, 13 Drawing Sheets

PROPAGATION DELAY COMPENSATION IN DAISY-CHAIN TOPOLOGIES

TECHNICAL FIELD OF THE INVENTION

This invention relates generally to power conversion, and more specifically to communications topologies useful for implementing multi-level power conversion.

BACKGROUND

In modern vehicle systems, power converters are commonly employed to transfer voltage energy stored a vehicle battery to a load, such as a motor of an electric or hybrid vehicle. Multi-level power converters, which operate by actuating clusters of regulator cells to collectively transfer energy from a power supply to a load, offer reduced switching losses and therefore reduced energy usage in comparison with traditional power converters. While multi-level power converters offer an attractive alternative to traditional power converters, a need exists for improvements in multi-level converters that are suitable for implementation and use in electric or hybrid vehicles.

SUMMARY

This disclosure is directed to communications for multi-level power conversion that utilizes measured propagation delays to communicate in synchronization with clusters coupled in a daisy chain topology. As one example, a method is described. The method includes determining, by a main controller, a measured delay time associated with a first cluster coupled with a second cluster in a daisy chain such that the main controller communicates with the second cluster through an isolated interface of the first cluster. The method further includes determining, by the main controller and based on the measured delay time, a propagation delay associated with the first cluster. The method further includes generating, by the main controller, a message to the second cluster which includes a command to be executed by the second cluster. The method further includes sending, by the main controller through an isolation interface of the main controller, the message to the second cluster based on the determined propagation delay to execute the command to actuate the second cluster synchronized to a switching clock of the main controller.

According to another example, an electronic control unit (ECU) is described. The ECU includes a main controller configured to determine a measured delay time associated with a first cluster coupled with a second cluster in a daisy chain such that the microcontroller communicates with the second cluster through an isolated interface of the first cluster. The main controller is further configured to determine, based on the measured delay time, a propagation delay associated with the first cluster. The main controller is further configured to generate a message to the second cluster which includes a command to be executed by the second cluster. The main controller is further configured to send, through an isolation interface of the main controller, the message to the second cluster based on the determined propagation delay to execute the command to actuate the second cluster synchronized to a switching clock of the main controller.

According to another example, a system is described. The system includes a main controller, and a plurality of clusters including at least a first cluster coupled with a second cluster in a daisy chain such that the main controller communicates with the second cluster through an electrically isolated interface of the first cluster. The main controller is configured to determine a measured delay time associated with the first cluster. The main controller is further configured to determine, based on the measured delay time, a propagation delay associated with the first cluster. The main controller is further configured to generate a message to the second cluster which includes a command to be executed by the second cluster. The main controller is further configured to send, through an isolation interface of the main controller, the message to the second cluster based on the determined propagation delay to execute the command to actuate the second cluster synchronized to a switching clock of the main controller.

BRIEF DESCRIPTION OF THE DRAWINGS

The present invention will now be described, by way of example with reference to the accompanying drawings, in which.

DETAILED DESCRIPTION

Figure 1:
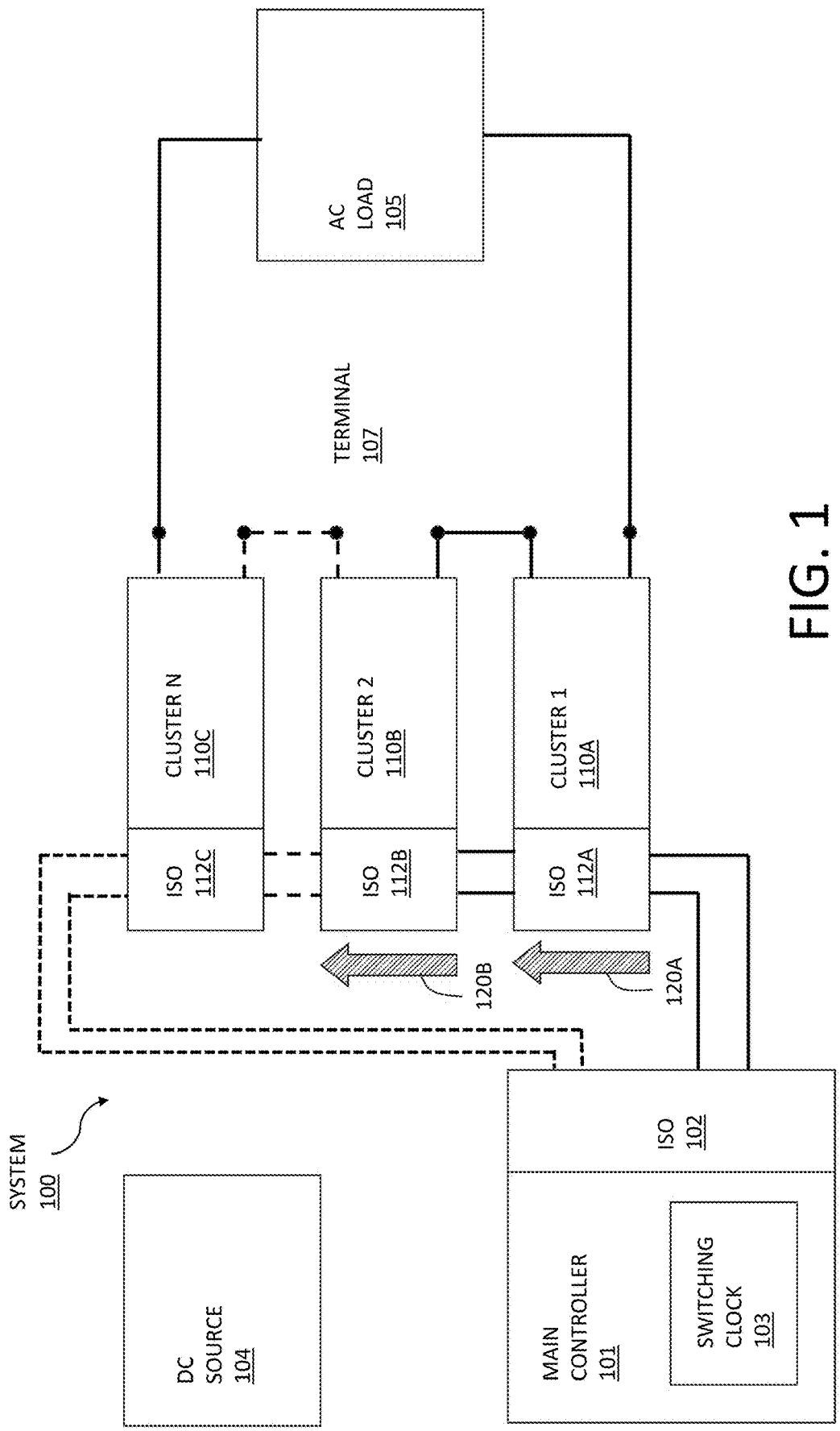
FIG. 1 is a block diagram that illustrates one example of a multi-level converter system according to some embodiments.

FIG. 1 is a block diagram that illustrates one example of a multi-level converter system 100 according to some embodiments. As shown in FIG. 1, the system 100 includes a main controller 101 and a plurality of clusters 110A-110C coupled between a direct current (DC) source 104, such as a battery, and an alternating current (AC) load 105.

The main controller 101, which may be a processing component such as a microcontroller, is coupled to control the N clusters 110A-110C to transfer energy from the DC source 104 to the AC load 105, for example such that each cluster is configured to supply a portion of a high voltage output to the AC load 105. The clusters 110A-110C may include any number of N clusters that are configured to be switched in a predefined number of states (e.g., two or three states, such as a positive supply voltage, substantially zero volts, and optionally a negative supply voltage) to supply respective portions of a high voltage output (e.g., greater than 100 or 200 volts) at terminal 107 to the AC load 105. As shown in FIG. 1, the main controller 101 is coupled to communicate with the N clusters 110A-110C in a daisy-chain topology. In the daisy chain topology, messages from the main controller 101 to all but the first cluster 110A pass other clusters of the daisy chain. Similarly, reply messages to the main controller 101 from the clusters 110A-110C pass through other clusters of the daisy chain. For example, as shown in FIG. 1, main controller 101 is coupled through an input of an isolation interface 102 to an input of an isolation interface 112A of the first cluster 110A, which has an I/O port coupled to an I/O port of isolation interface 112B of the second cluster 110B, which in turn has an I/O port coupled to an I/O port of isolation interface 112C of the third cluster 110C.

As also shown in FIG. 1, in an optional embodiment as indicated by the dashed lines in FIG. 1 between cluster 110C and main controller 101, the N clusters 110A-110C may be coupled in a "daisy chain in loop" topology in which messages from the main controller 101 to all but the first cluster 110 pass through isolation interfaces 112A-112C of one or more other clusters like in a daisy chain topology. Unlike the daisy chain topology, in the "daisy chain in loop" topology, clusters 110A-110C send reply messages to the main controller 101 either through other clusters of the daisy chain, or directly to the main controller 101 through the third cluster 110C (the Nth cluster, i.e., the cluster furthest from the main controller 101) of the daisy chain.

As shown in FIG. 1, main controller 101 may operate to control the clusters 110A-110C based on a switching clock 103 of the main controller 101, which may be based on a highly accurate clock reference, such as a precise crystal oscillator. Coupled in a daisy chain topology (or an optional "daisy chain in loop" topology) as shown in FIG. 1, messages from main controller 101 to clusters of the daisy chain may experience propagation delays $T_{PROP}$ 120A, 120B that impact when a message reaches an intended cluster. For example, when main controller 101 sends a message directed to the second cluster 110B through isolation interface 102, a delay imposed by the first cluster 110A on the message may be referred to as propagation delay $T_{PROP}$ C1 120A associated with the first cluster 110A. Similarly, the time it takes for a message intended for the third cluster 110C to pass through the second cluster 110B may be referred to as propagation delay $T_{PROP}$ C2 120B associated with the second cluster 110B.

In some examples, main controller 101 may be configured to control many more than the three clusters 110A-110C depicted in FIG. 1, for example a number N between 10 and 20 clusters, or even more clusters in some examples. As one specific example where system 100 includes 16 clusters, a message from the main controller 101 to the N=16th cluster may be impacted by propagation delays of N−1=15 clusters before it reaches the $16^{th}$ cluster, which may significantly impact when messages are received by the $16^{th}$ cluster.

To control the clusters 110A-110C to actuate synchronously (e.g., at switching times defined by the switching clock 103), the main controller 101 determines one or more measured delay times associated with one or more of the clusters 110A-110C, and based on the measured delay times, and determines propagation delays $T_{PROP}$ 120A, 120B associated with the clusters 110A-110C based on the measured delay times. The main controller 101 may store the determined propagation delays $T_{PROP}$ 120A, 120B in memory (e.g., a data register or other memory component). The main controller 101 generates messages and sends them to the clusters 110A-110C to actuate the clusters 110A-110C based on the determined propagation delays $T_{PROP}$ 120A, 120B, such that the clusters 110A-110C are actuated synchronously, for example synchronous with the switching clock 103 of the main controller 101.

Figure 3A:
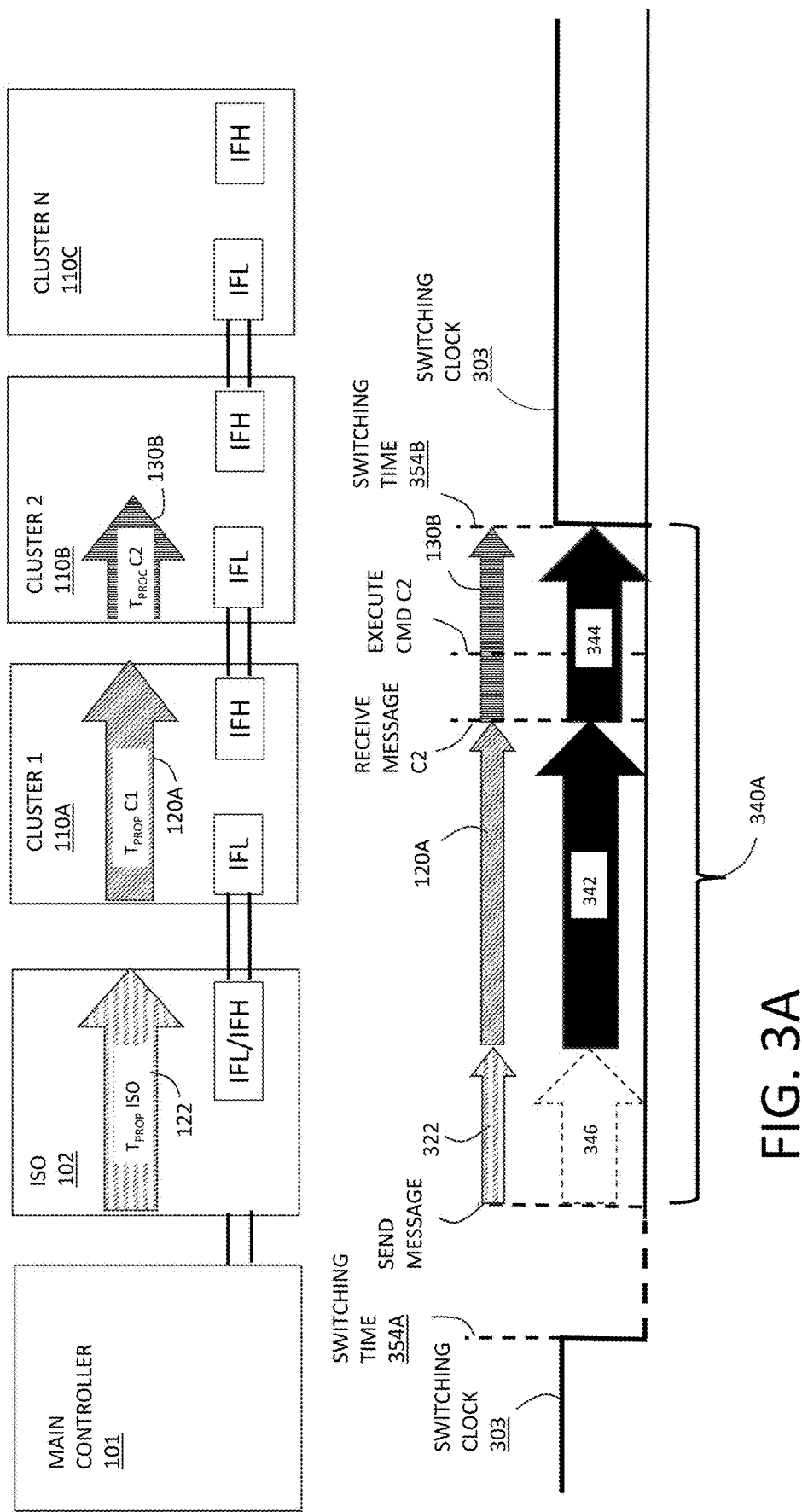
FIGS. 3A-3C depict a main controller coupled through an isolation interface to a plurality of clusters arranged in a daisy chain topology, and timing diagrams relative to a switching clock of the main controller according to some embodiments.
Figure 3B:
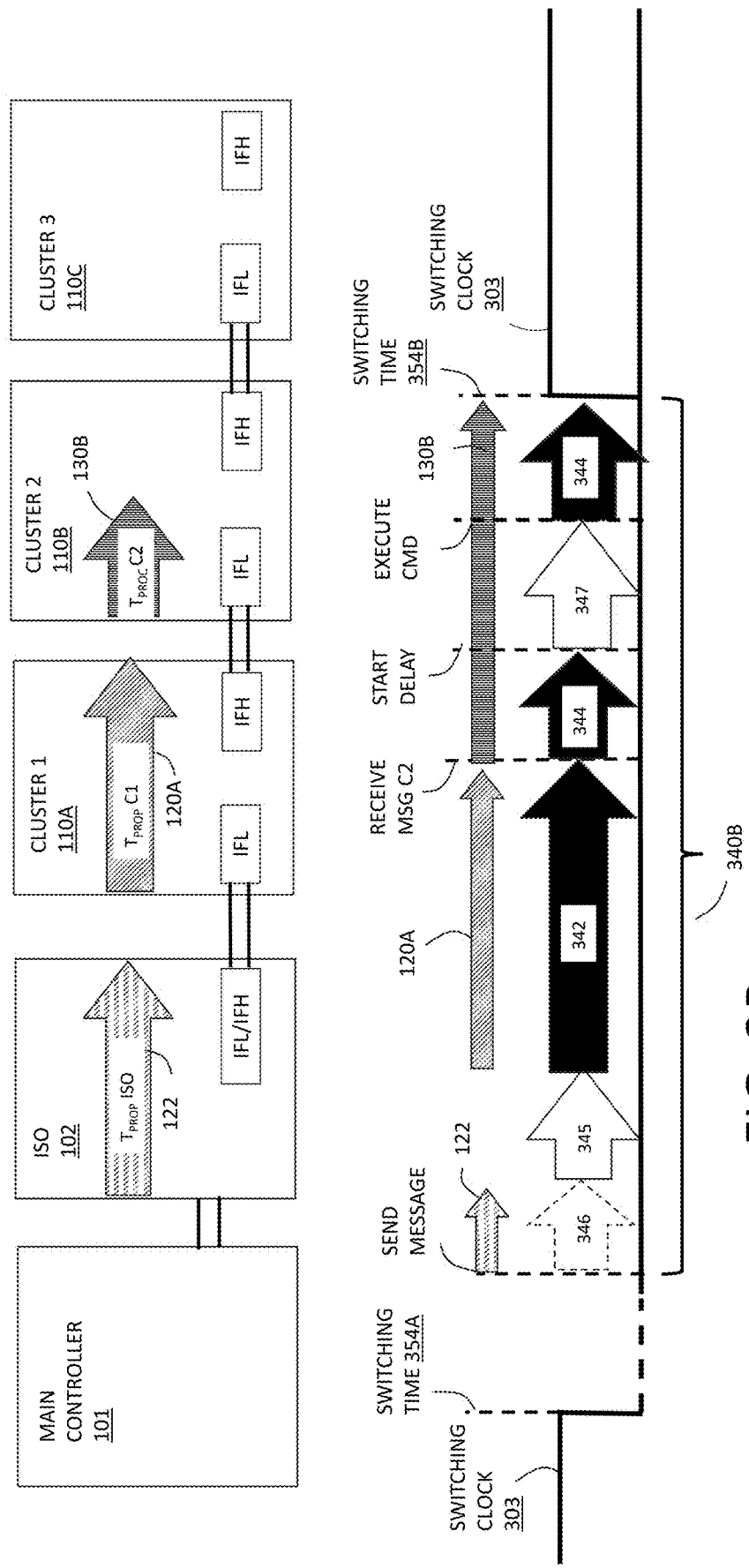
Figure 3C:
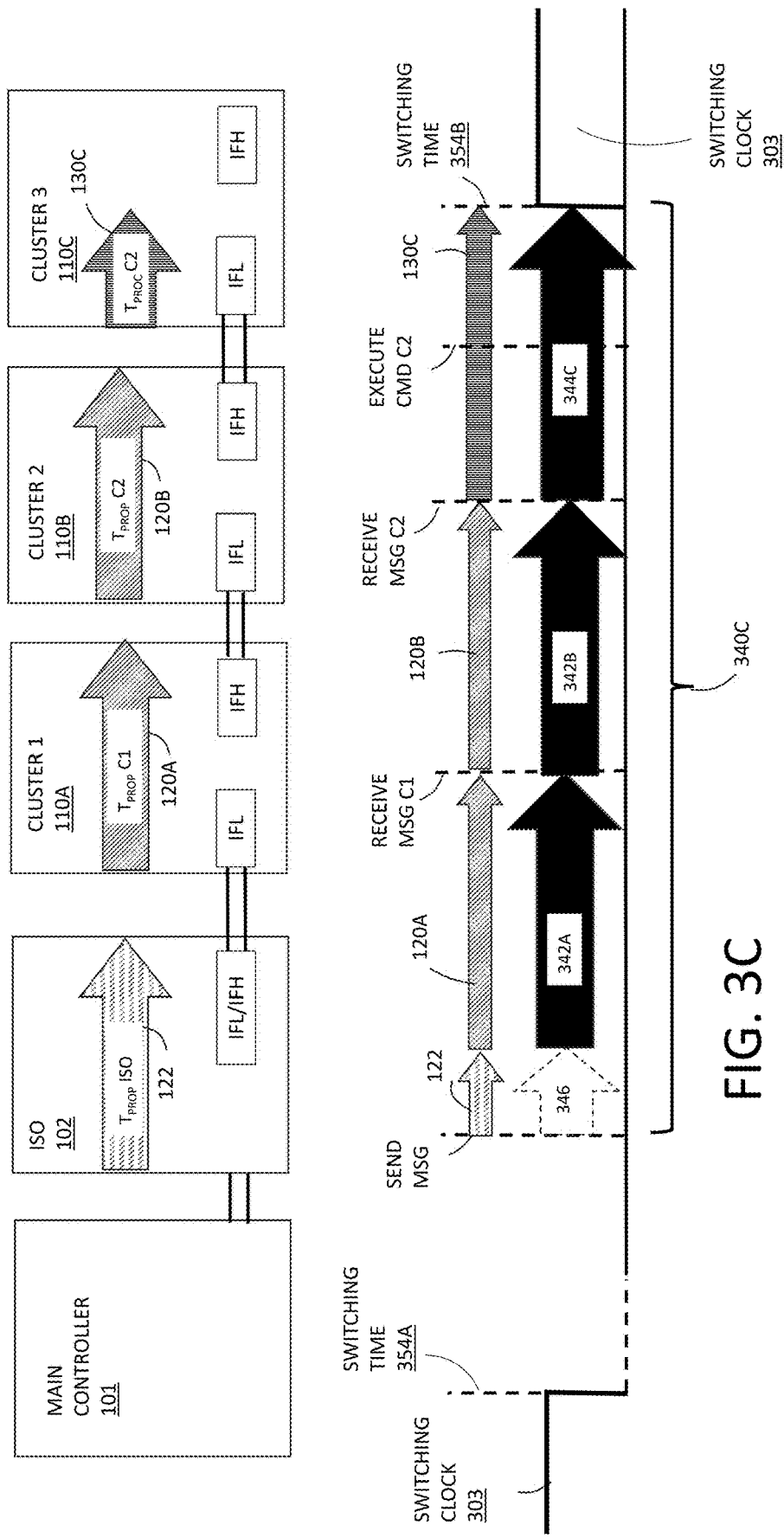

In some examples, the main controller 101 sends messages to the clusters 110B, 110C early enough to accommodate for the propagation delays $T_{PROP}$ (e.g., 120A, 120B) of preceding clusters of the daisy chain, as depicted in FIGS. 3A-3C and described below. In some examples, the main controller 101 may further determine process delays $T_{PROC}$ associated with one or more of the clusters 110A-110C and send messages early enough to compensate for the process delay $T_{PROC}$ of an actuated cluster, in addition to the propagation delays $T_{PROP}$ of preceding clusters, as also shown in FIG. 3A and described below. In still other examples, the main controller 101 may send messages even earlier than needed to compensate for the propagation delays $T_{PROP}$ 120A, 120B and/or process delays $T_{PROC}$ of preceding clusters, along with instructions to delay execution of the command, as shown in FIG. 3C and described below.

System 100 depicted in FIG. 1 may be particularly suited to some applications. For example, system 100 may use relatively inexpensive isolation interfaces 102, and 112A-112C, which may be the same and substantially interchangeable with one another. System 100 is configured to communicate using a stable and redundant daisy-chain topology without requiring relatively precise, and relatively expensive, oscillators in each cluster to achieve synchronization at high speeds. Instead, the advantages of a daisy chain topology may be obtained at relatively low cost.

Figure 2:
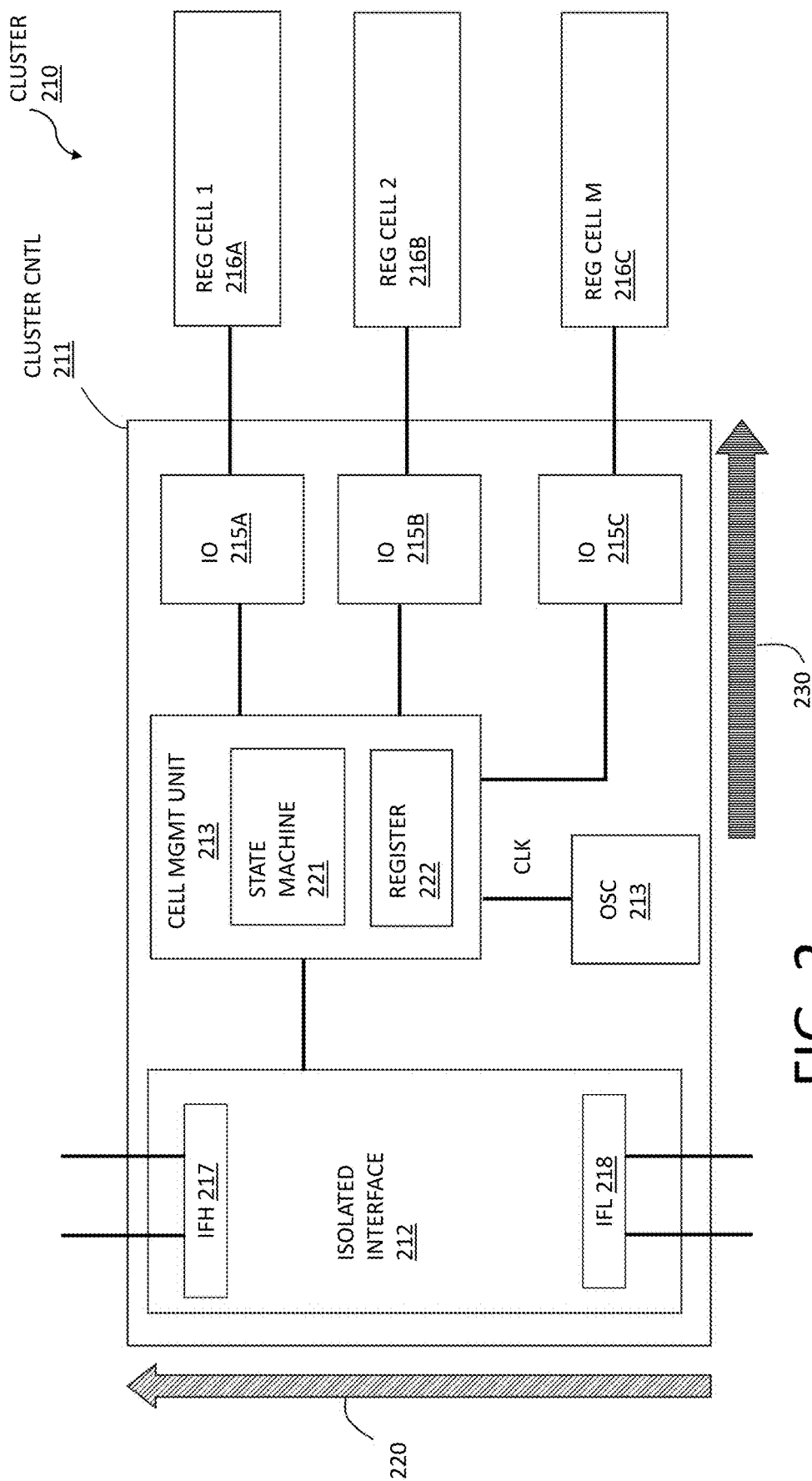
FIG. 2 is a block diagram that depicts one example of a cluster, which may be coupled with other clusters in a daisy chain topology as shown in the example of FIG. 1, according to some embodiments.

FIG. 2 is a block diagram that depicts one example of a cluster 210, which may be coupled with other clusters 110A-110C in a daisy chain topology as shown in the example of FIG. 1. As shown in FIG. 2, the cluster 210 includes an isolation interface 212 with a pair of IFL I/O ports 218 and a pair of IFH I/O ports 217, which carry respective polarities of a differential signal. The isolation interface 212 may include any type of interface capable of the electrically isolated transmission of messages. For examples, the isolation interface 212 may be configured to utilize inductive, capacitive, optical, mechanical, or other electrically isolated coupling to communicate messages while maintaining electrical isolation between system 100 components.

Referring again to FIG. 1, in some examples, the main controller 101 operates to control the clusters 110A-110C by communicating universal asynchronous receiver-transmitter (UART) messages that include a series of frames of digital values, which may, for example, identify a recipient of a message (e.g., to one or all of the clusters 110A-110C), one or more commands to be executed by the clusters 110A-110C, and/or instructions to send a reply message that acknowledges a command has been executed. Such a command may, for example, instruct a cluster to perform a read operation to read a value, such as sensed data (e.g., a temperature measurement of battery cells of the clusters 110A-110C, or other data) or other value from a memory (e.g., a data register) and send a reply to the main controller 101. Such a command may include, in other examples, instructions to write a value to memory, such as a setting, parameter, data, or other value. In still other examples, such a command may include instructions to actuate a cluster, for example to drive one or more external I/O ports to change a state of the cluster to supply a portion of an output voltage at terminal 107 to AC load 105, and send a reply to the main controller 101 to acknowledge the cluster has been actuated.

In some examples, the main controller 101 may send messages, which may include commands, to a specific one of the N cluster 110A-110C. In other examples, the main controller 101 may send broadcast messages addressed to all N clusters 110A-110C.

Referring again to FIG. 2, the isolation interface 212 is coupled to a cell management unit 214, which is configured to receive messages, for example, UART messages, and send reply messages to the main controller 101 in acknowledgement. The cell management unit 214 is coupled to drive at least one regulator cell. In the FIG. 2 example, the cell management unit 214 is configured to drive a plurality of M I/O ports 215A-215C, each of which is coupled to control a respective regulator cell 216A-216C of a plurality of M regulator cells.

As shown in FIG. 2, the cluster controller 211 further includes an oscillator 213, and the cell management unit 214 includes a state machine 221 and one or more register(s) 222. The cell management unit 214 operates to, based on a clock signal from the oscillator 213, communicate via isolation interface 212 and control regulator cells 216A-216C via I/O ports 215A-215C.

For example, the cell management unit 214 may write frames of a message to the register(s) 222 in first cycle(s) of the state machine 221. One or more frames of the message may indicate an addressee of the message (a particular cluster 210). Defined by the oscillator 213 clock, in further cycle(s) of the state machine 221, the cell management unit 214 may perform a read operation to determine an addressee of the message, for example whether the message is intended to for cluster 210 or another cluster. If cluster 210 is not the addressee, in further cycle(s) of the state machine 221, cluster 210 may send the message to a subsequent cluster coupled in the daisy chain topology.

As shown in FIG. 2, the time it takes for a message intended for another cluster in the daisy chain topology to pass through cluster 210 as described above may be referred to as a propagation delay $T_{PROP}$ 220 of the cluster 210. As described herein, a main controller 101 may be configured to perform measurements to determine the propagation delays $T_{PROP}$ 220 associated with cluster 210, and use the determined propagation delay $T_{PROP}$ 220 to send messages to accommodate for the propagation delay $T_{PROP}$ 220, so that other subsequent clusters of the daisy chain may be synchronously actuated based on the propagation delay $T_{PROP}$ 220.

If the cell management unit 214 determines that cluster 210 is the addressee for a message, the cell management unit 214 may read further frames of the message in further cycle(s) of the state machine 221. The cell management unit 214 may, in further cycle(s) of the state machine 221, output control signals to one or more of the regulator cells 216A-216C via I/O ports 215A-215C, to drive at least some of the regulator cells 216A-216C to change state, and modify a power supply state of the cluster 210.

As shown in FIG. 2, the time it takes for a message intended for cluster 210 to be read and a command to be executed (a read operation, a write operation, a command to actuate the cluster 210, or other command) may be referred to as a process delay $T_{PROC}$ 230 of the cluster 210. As described herein, the main controller 101 may send messages to accommodate for the process delay $T_{PROC}$ 230, in addition to the propagation delay $T_{PROP}$ 220 as described above, so that clusters of the daisy chain are synchronously actuated.

FIGS. 3A-3C depict main controller 101 coupled through isolation interface 102 to a plurality of clusters 110A-110C arranged in a daisy chain topology, and timing diagrams relative to a switching clock 103 of the main controller 101. In the daisy chain topology, the main controller 101 communicates with, for example, the second cluster 110B by sending messages through an isolation interface of the first cluster 110A as described above with respect to FIG. 1. Similarly, the main controller 101 communicates with an optional third cluster 110C through the isolation interfaces of both the first cluster 110A and the second cluster 110B.

According to the example of FIG. 3A, the main controller 101 is configured to send messages to the second cluster 110B timed such that the second cluster 110B actuates the second cluster 110B synchronized with the switching clock 303. In the timing diagram, two switching times 354A and 354B of the switching clock 303 are shown, which define a switching period between them. According to the FIG. 3A example, main controller 101 is configured to send a message to the second cluster 110B, such that second cluster 110B executes a command to actuate the second cluster 110B synchronized to the switching time 354B.

Before sending a message to the second cluster 110B, main controller 101 may perform measurements to determine delays associated with the components of the daisy chain topology, for example the measurements shown in FIGS. 4A-4D or other measurements not described. For example, as shown in FIG. 3A the main controller 101 may determine a propagation delay $T_{PROP}$ C1 120A of the first cluster 110A, which corresponds to a delay the first cluster 110A imposes on messages directed to other clusters 110B, 110C of the daisy chain. In addition, the main controller 101 may further determine a process delay $T_{PROC}$ C2 130B of the second cluster 110B, which corresponds to a time for the second cluster 110B to receive a message and execute a command. In addition, the main controller 101 may further determine other delays, such as a propagation delay $T_{PROP}$ ISO 122 of an isolation interface 102 of the main controller 101, which corresponds to a delay the isolation interface 102 imposes on messages sent to the clusters 110A-110C.

Figure 4A:
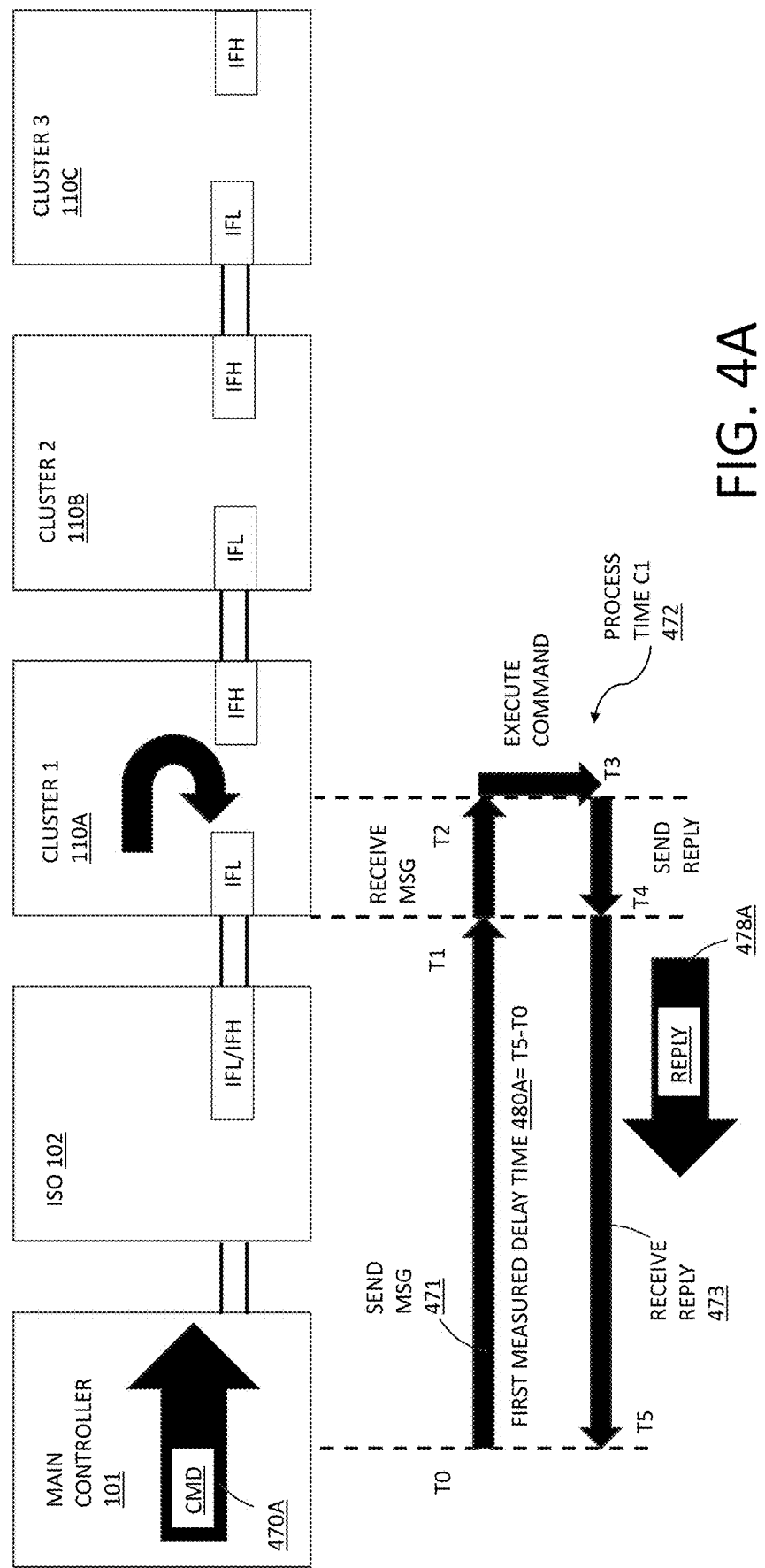
FIGS. 4A-4D show examples of measurements that may be performed by a main controller as part of a process to determine a propagation delay, according to some embodiments.
Figure 4B:
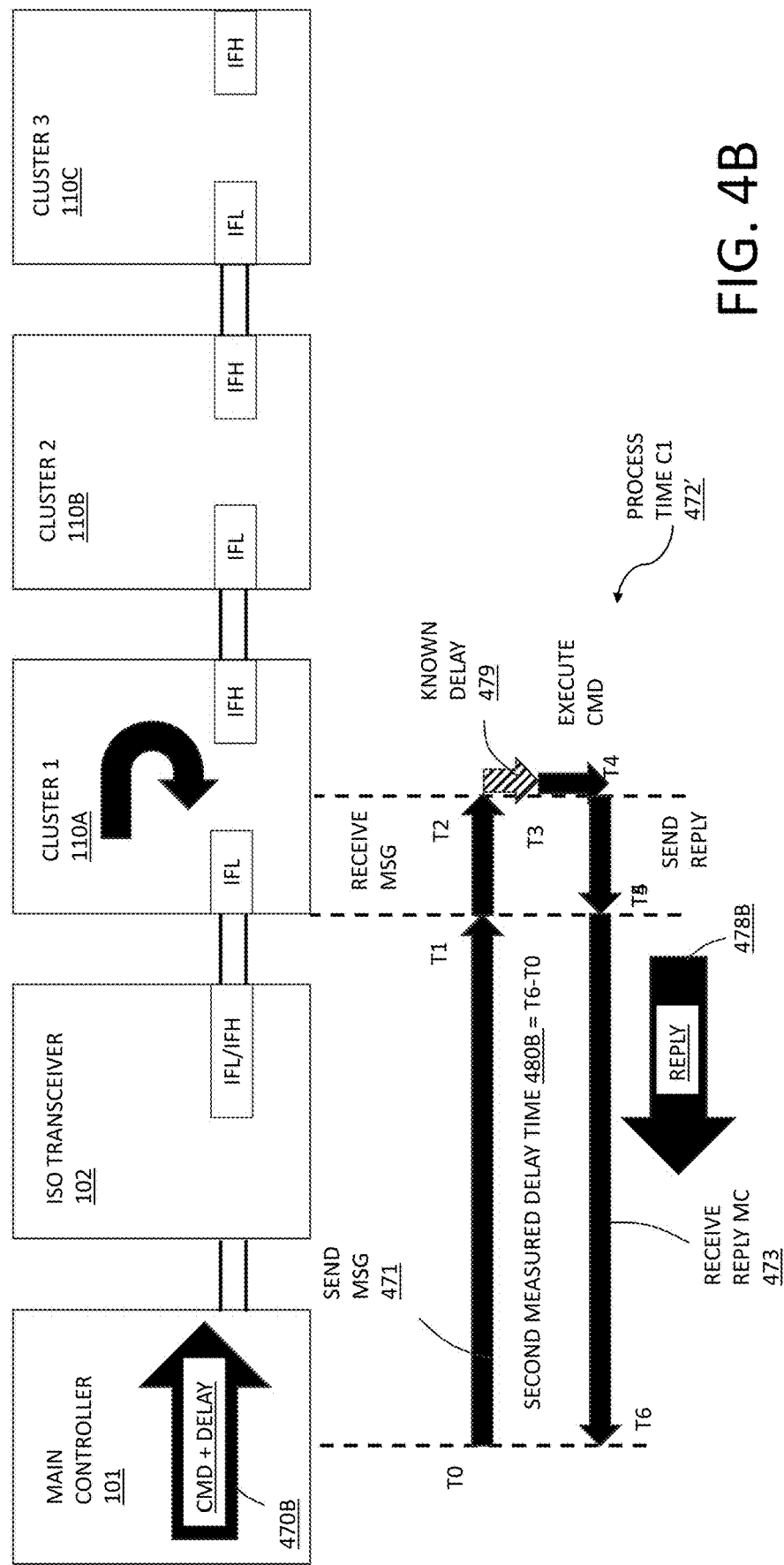
Figure 4C:
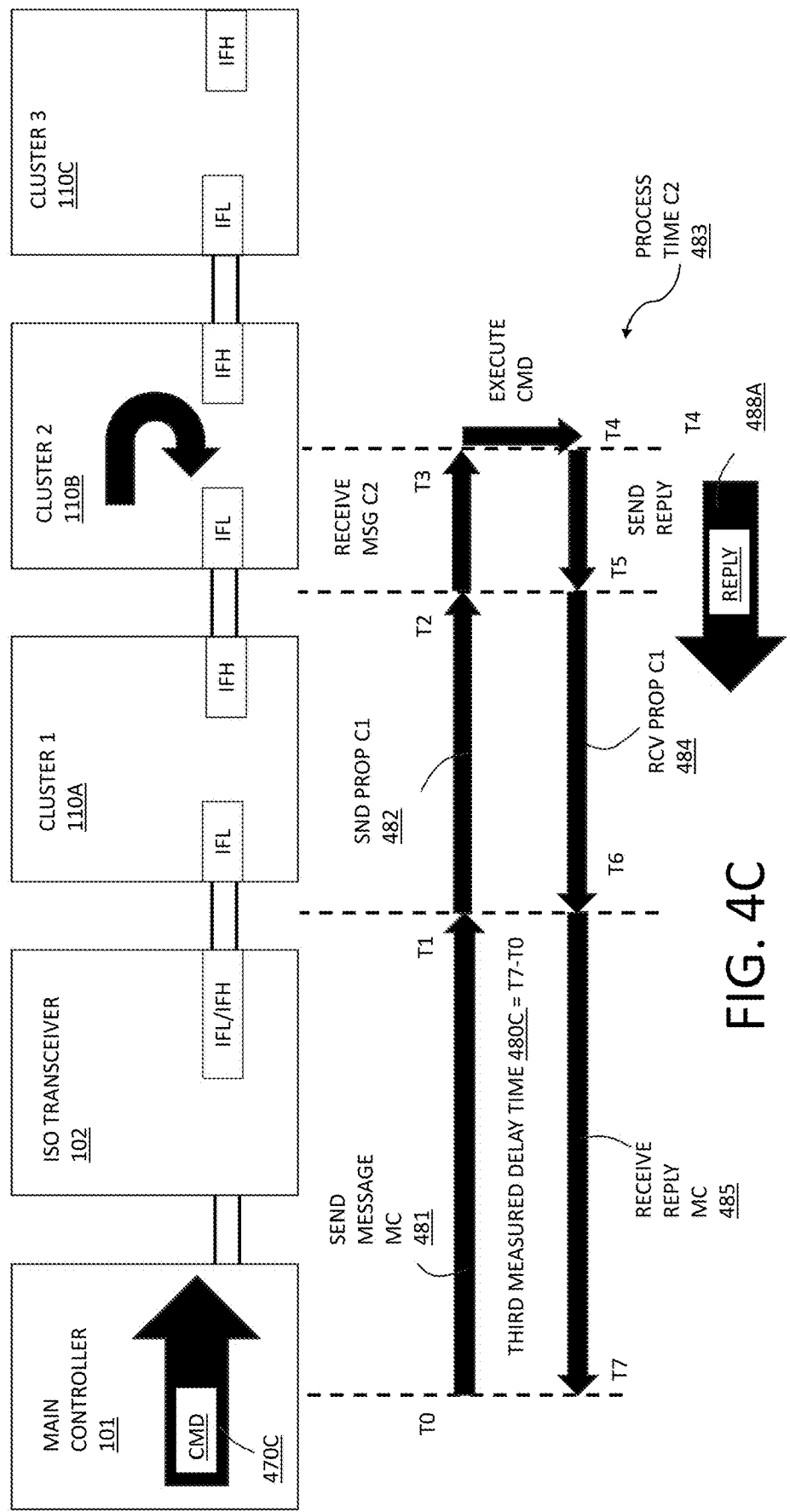

In some examples, the main controller 101 may perform measurements, such as those described in FIGS. 4A-4C or other measurements not described, to determine the propagation delay $T_{PROP}$, and/or process delay $T_{PROC}$ of each of N clusters 110A-110C arranged in the daisy chain during times in which the system 100 is operated slowly to transfer energy to a load, such as AC load 105, coupled to terminal 107. For example, the main controller 101 may perform such measurements during startup (e.g., turn on) of an AC load 105, or during times when the AC load 105 is driven relatively slowly by system 100, allowing time for the measurements to be performed without impeding converter to supply energy to the AC load 105. As one example, where the AC load 105 is an electric or hybrid vehicle motor, the main controller 101 may perform such measurements during vehicle startup, when the vehicle is driven slowly, and/or stopped (e.g., at a stoplight). In other examples, the main controller 101 may perform such measurements periodically as the vehicle is being operated. In still other examples, the main controller 101 may perform such measurements in response to a change in conditions, for example when a change in or absolute value of a measured ambient or battery temperature exceeds a predetermined or variable threshold value.

In some examples, the main controller 101 may determine a propagation delay $T_{PROP}$ and/or a process delay $T_{PROC}$ associated with each cluster 110A-110C of the daisy chain, and store them in a memory, such as one or more registers of the main controller 101. The main controller 101 may use the stored propagation $T_{PROP}$ and/or process delays $T_{PROC}$ to precisely time the communication of messages to the clusters 110A-110C, and in some examples the execution of commands to actuate the clusters 110A-110C, synchronized to the main controller 101. FIGS. 3A-3B depict just some such examples of synchronized messaging, applied to a message sent to the second cluster 110B. In practice, a main controller 101 may be coupled to many more clusters in a daisy chain, and the described techniques may be applied to any of the clusters to synchronously actuate the clusters.

To control the second cluster 110B synchronously with the switching clock 303, the main controller 101 may generate and send messages to the second cluster 110B early enough to accommodate the propagation delay $T_{PROP}$ C1 120A of the first cluster 110A, which may be a value previously determined by the main controller 101. In the timing diagram in FIG. 3A, the main controller 101 has generated and sent a message a duration 340A before the switching time 354B, such that the message arrives at the second cluster 110B with sufficient time for the command to be executed at or close to the switching time 354B. As shown in FIG. 3A, the duration 340A includes a segment 342, to accommodate for the propagation delay $T_{PROP}$ C1 120A of the first cluster 110A.

In some examples, the main controller 101 may define a length of the duration 340A to accommodate more than the propagation delay $T_{PROP}$ C1 120A of the first cluster 110A. For example, as also shown in FIG. 3A, the duration 340A also includes a second segment 444 to accommodate the process time $T_{PROC}$ C2 130B of the second cluster 110B. In some examples, the process delay $T_{PROC}$ C2 130B has been determined to account for drift of a local oscillator of the cluster 110B. As shown in FIG. 3A, the duration 340A further includes a third segment 446 to accommodate for the propagation delay $T_{PROP}$ ISO 122 as well, which represents a propagation delay $T_{PROP}$ imposed on messages by the isolation interface 102 from the main controller 101 to the clusters 110A-110C.

By controlling the duration 340A to accommodate for the propagation delay $T_{PROP}$ C1 120A of the first cluster 110A, as well as optionally the propagation delay $T_{PROP}$ ISO 122 and/or process time $T_{PROC}$ C2 130B of the second cluster 110B, the main controller 101 may cause commands to be executed synchronously, meaning at the same time as or close to the switching time 354B, defined by the switching clock 303.

In the example of FIG. 3A, two switching times 354A and 354B are shown as respective rising and falling edges of the switching clock 303. In some examples, the main controller 101 may send messages to one or more clusters 110A-110C to be executed synchronously with switching time 354B after switching time 354A as shown in FIG. 2. In other examples, main controller 101 may send some messages even earlier, for example prior to switching time 354A.

FIG. 3B is substantially similar to the example of FIG. 3A, where the main controller 101 is configured to send a message to the second cluster 110B a duration 340B before the switching time 354B and includes segments 342, 344, and 346 to accommodate for the respective delays 122, 120A and 130B. According to the FIG. 3B example, the main controller 101 sends the message a duration 340B even earlier (i.e., including a further segment 345) than needed to accommodate the delays 120A, 122, and/or 130B, and generates the message with instructions to apply an delay 347 to execute the command by the second cluster 110B (e.g., to actuate the second cluster 110B after a number of state machine or clock cycles of the second cluster 110B).

According to the example of FIG. 3B, the main controller 101 may adjust either of the duration 340B or the delay 347 to precisely time messages to the second cluster 110B such that they are executed synchronously with the switching time 354B.

FIG. 3C includes a timing diagram of a message sent to a third cluster 110C arranged in the daisy chain topology such that the third cluster 110C receives messages from the main controller 101 through isolation interfaces of the first cluster 110A and the second cluster 110B. According to the example of FIG. 3C, the main controller 101 has determined a propagation delay $T_{PROP}$ ISO 122 associated with the isolation interface 102 of the main controller 101, a propagation delay $T_{PROP}$ C1 120A of the first cluster 110A, a propagation delay $T_{PROP}$ C2 120B of the second cluster 110B, and optionally a process delay $T_{PROC}$ C3 130C of the third cluster 110C, which may each be based on previously performed measurements and stored in a memory. As shown in FIG. 3C, the main controller 101 is configured to send the message to the third cluster 110C a duration 340C before the switching time 354B that includes a segment 342A to accommodate the propagation delay $T_{PROP}$ C1 120A of the first cluster 110A and a segment 342B to accommodate the propagation delay $T_{PROP}$ C2 120B of the second cluster 110B. As also shown in FIG. 3C, the duration 340C further includes an optional segment 344C to accommodate the process delay $T_{PROC}$ C3 130C of the third cluster 110C, and/or a optional segment 346 to accommodate the propagation delay $T_{PROP}$ ISO 122 of the isolation interface 102.

In some examples, the main controller 101 is configured to control many more clusters coupled in the daisy chain. In some examples, the main controller 101 may measure propagation $T_{PROP}$ and/or process delays $T_{PROC}$ associated with each of N clusters of the daisy chain, store the values in memory, and send messages to accommodate the determined propagation delays $T_{PROP}$ and/or process delays $T_{PROC}$ to time the generation and sending of messages, as well as optionally the execution of commands to actuate the clusters, synchronized with the switching clock 103.

As described above with respect to FIGS. 3A-3C, main controller 101 may be configured to determine propagation delays $T_{PROP}$, process delays $T_{PROC}$ associated with clusters 110A-110C of a multi-level converter system 100 as shown in FIG. 1. FIGS. 4A-4D depict examples of measurements that may be performed by main controller 101 to determine the propagation delays $T_{PROP}$ and/or process delays $T_{PROC}$ associated with clusters of a multi-level converter system 100 as described above.

FIG. 4A shows one example of a measurement that may be performed by the main controller 101 according to some embodiments. According to the example of FIG. 4A, the main controller 101 sends a first test message 470A to the first cluster 110A. The first test message 470A includes a command that instructs the first cluster 110A to perform an operation, such as a read or write operation, and send a first reply message 478A to the main controller 101 as an acknowledgement.

According to the FIG. 4A example, the main controller 101 determines a first measured delay time 480A associated with the first cluster 110A by comparing a time T0 at which the main controller 101 sends the first test message 470A to the first cluster 110A, and a time T5 when the main controller 101 receives a first reply message 478A from the first cluster 110A in acknowledgement of the first test message 470A.

As shown in the example of FIG. 4A, the first measured delay time 480A can be broken into distinct time periods.

For example, as shown in FIG. 4A, the first measured delay time 480A includes a time period 471 from T0 to T1, which corresponds to a propagation delay $T_{PROP}$ ISO 122 imposed by the isolation interface 102 on the first test message 470A from the main controller 101 to the first cluster 110A. As also shown in FIG. 4A, the first measured delay time 480A also includes a time period 472 from T1 to T4, which corresponds to process delay $T_{PROC}$ C1 130A associated with the first cluster 110A.

FIG. 4B shows another measurement that may be performed by the main controller 101 according to some embodiments. As shown in FIG. 4B, the main controller 101 sends a second test message 470B to the first cluster 110A, which, like the first test message 470A, includes a command to be executed, such as a read or write command, and instructions to generate and send a second reply message 478B in acknowledgement of the second test message 470B. As also shown in FIG. 4B, the message further includes a known delay 479, with instructions to delay execution of the command, and/or the generation or sending of the second reply message 478B, by the known delay 479, which may be specified as number of clock cycles.

According to the example of FIG. 4B, to determine the second measured delay time 480B, the main controller 101 compares a time T0 at which the main controller 101 sent the second test message 470B, and a time T6 when the main controller 101 received a second reply message 478B in acknowledgement of the second test message 470B. The second measured delay time includes a C1 process time 472', which corresponds to a process time of the C1 cluster 110A as impacted by the known delay 479.

In some examples, the main controller 101 compares the first measured delay time 480A and the second measured delay time 480B to determine a first time difference as part of a process to determine a propagation delay $T_{PROP}$ C1 of the first cluster 110A. For example, the main controller 101 may determine an oscillator drift of the first cluster 110A based on the first time difference. As an example, since the first test message 470A and the second test message 470B differ only the known delay 479 (e.g., the process time C1 472'), the first time difference may indicate an impact that drift of the first cluster 110A oscillator had on execution of the second test message 470B relative to execution of the first test message 470A. As an example, if the known delay 479 of the second test message 470B was 4 clock cycles, but the first time difference is equivalent to eight clock cycles, then the main controller 101 may determine that the first cluster 110A oscillator is operating 4 clock cycles out of phase.

As a further step, the main controller 101 may use the determined oscillator drift (OSC DRIFT C1) to calculate a process delay $T_{PROC}$ C1 430A associated with the first cluster 110A, by compensating a known process delay (KPD) of a typical cluster like C1, C2, and C3 by adding or subtracting the determined oscillator drift, for example according to equation (1) below.

$$T_{PROC}\ C1 = KPD + -OSC\ DRIFT\ C1 \qquad (1)$$

Once the main controller 101 determines the process delay $T_{PROC}$ C1 330A of the first cluster 110A, the main controller 101 may subtract the determined process delay $T_{PROC}$ C1 330A from the first measured delay time 480A (FMDT), to determine the sum of $T_{PROP}$ ISO+$T_{PROP}$ ISO REPLY (time periods 471 and 473 in FIG. 4A) based on equations (2) below:

$$T_{PROP}\ ISO + T_{PROP}\ ISO\ REPLY = (FMDT - T_{PROC}\ C1) \qquad (2)$$

In some examples, the respective propagation delays $T_{PROP}$ ISO and a $T_{PROP}$ ISO REPLY imposed on messages from the main controller 101 and replies from the clusters 110A-110C, may not be identical, as the main controller 101 utilizes different mechanisms to couple to the isolation interface 102 for respective send and receive operations. In some examples, the main controller 101 may determine the propagation delay $T_{PROP}$ ISO 122, by adding (or subtracting) a compensation factor (CF) to compensate for a known timing imbalance between a delay imparted on messages sent by or received by the main controller 101, as shown in equations (3) and (4) below.

$$T_{PROP}\ ISO\ REPLY = T_{PROP}\ ISO + -CF \qquad (3)$$

$$T_{PROP}\ ISO = (FMDT - T_{PROC}\ C1 + -CF)/2 \qquad (4)$$

Figure 4D:
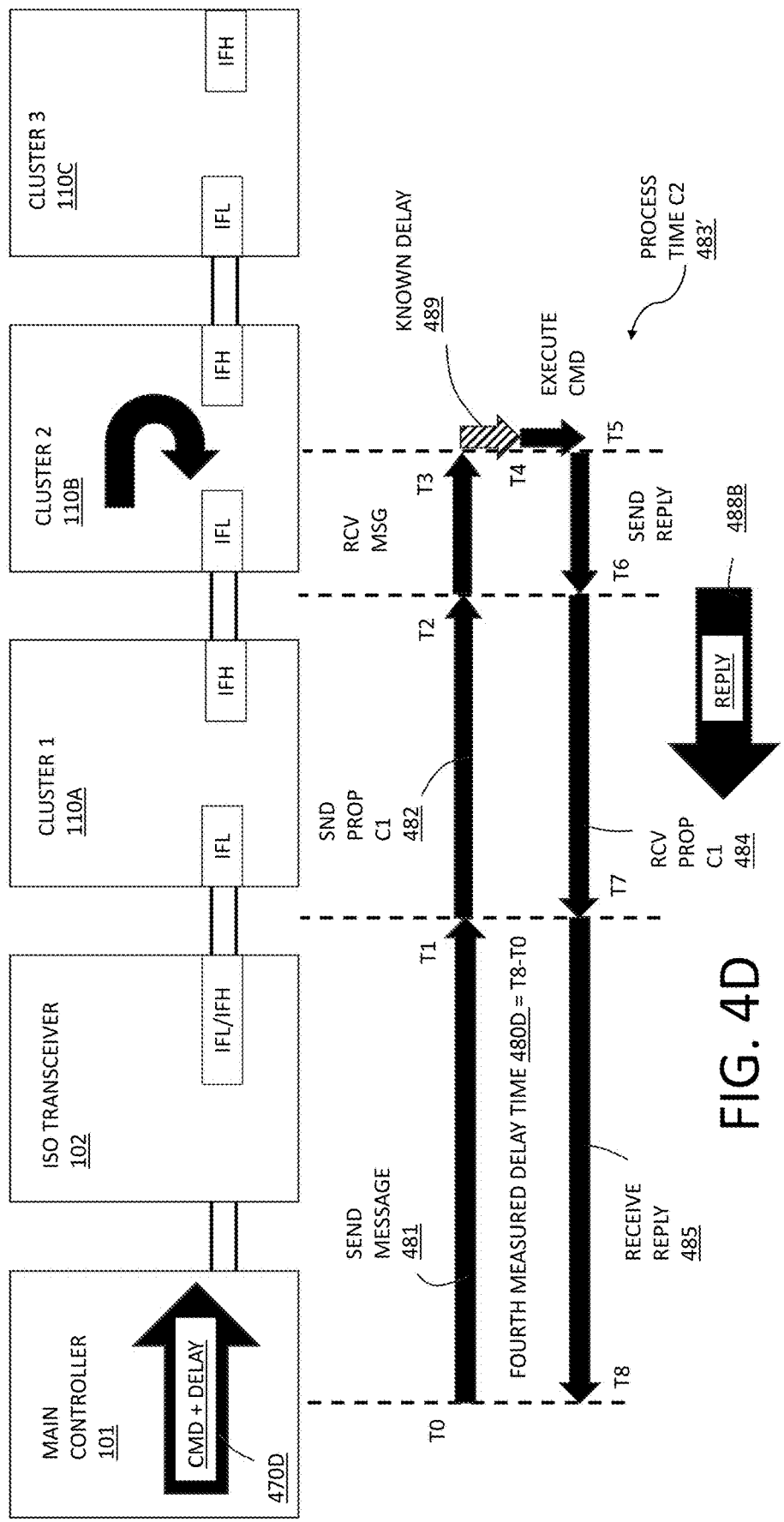

FIGS. 4C and 4D include timing diagrams that show further measurements that may be performed by the main controller 101 according to some embodiments. According to the example of FIG. 4C, the main controller 101 sends a third test message 470C, this time to the second cluster 110B. The third test message 470C includes a command with instructions for the second cluster 110B to perform an operation, such as a read or write operation, and send a third reply message 488A to the main controller 101 as an acknowledgement.

According to the FIG. 4C example, the main controller 101 determines a third measured delay time 480C, by comparing a time T0 at which the main controller 101 sends the third test message 470C, and a time T7 when the main controller receives a third reply message 488A from the second cluster 110B in acknowledgment of the third test message 470C.

As shown in the example of FIG. 4C, the third measured delay time 480C can be broken into distinct time periods 481-485. For example, as shown in FIG. 4C, the third measured delay time includes, from T0 to T1, a time period 481 which corresponds to a propagation delay $T_{PROP}$ ISO 122 imposed by the isolation interface 102 on the third test message 470C from the main controller 101 to the first cluster 110A. As also shown in FIG. 4C, the third measured delay time 480C also includes a time period 482, which corresponds to a propagation delay $T_{PROP}$ C1 120A of the first cluster 110A from T1, when the message is received at the first cluster 110A, until T2, when the third test message 470C is received by the second cluster 110B, after being read and sent by the first cluster 110A. As also shown in FIG. 4A, the third measured delay time 480C also includes a C1 process time 483 from T2 to T5, which corresponds to a process delay $T_{PROC}$ C2 130B of the second cluster 110B including the time to receive the second test message 470B, execute the command, and generate and send the third reply message 488A as an acknowledgement.

As also shown in FIG. 4C, the third measured delay time 480C further includes a time period 484 from T5 to T6, which corresponds to a propagation delay $T_{PROP}$ C1 REPLY of the first cluster 110A from T5, when the third reply message 488A is received at the first cluster 110A, until a time T6, when the third reply message 488A is sent to the main controller 101, after being read and sent by the first cluster 110A. As also shown in FIG. 4C, the third measured delay time 480C also includes a time period 485 from T6 to T7, which corresponds to a delay $T_{PROP}$ ISO REPLY imposed by the isolation interface 102 on the third reply message 488A from first cluster 110A to the main controller 101.

FIG. 4D shows one example of another measurement that may be performed by the main controller 101 according to some embodiments. As shown in FIG. 4D, the main controller 101 sends a fourth test message 470D to the second cluster 110B, which, like the third test message 470C, includes a command to be executed, such as a read or write command, and instructions to generate and send a fourth reply message 488B in acknowledgement of the fourth test message 470D. As also shown in FIG. 4D, the fourth test message 470D further includes a known delay 489, with instructions to delay execution of the command, or the generation and/or sending of the fourth reply message 488B during the C1 process time 483', delayed by the known delay 489, which may be specified as number of clock cycles.

According to the example of FIG. 4D, to determine the fourth measured delay time 480D, the main controller 101 compares a time T0 at which the main controller 101 sent the fourth test message 470D, and a time T8 when the main controller 101 received a fourth reply message 488B in acknowledgement of the fourth test message 470D. The second measured delay time includes a C1 process time 472', which corresponds to a process time of the C1 cluster 110A as impacted by the known delay 479.

The main controller 101 may compare the third measured delay time 480C and the fourth measured delay time 480D to determine a second time difference according to some embodiments. For example, the main controller 101 may use the second time difference to determine an oscillator drift associated with the second cluster 110B, for example by using the second time difference to identify an impact that drift of the second cluster 110B oscillator has on commands executed by the second cluster 110B. As an example, if the known delay 489 of the fourth test message was four clock cycles, but the second time difference is equivalent to eight clock cycles, then the main controller 101 may determine that the second cluster 110B oscillator is operating four clock cycles out of phase.

As a further step, the main controller 101 may use the determined oscillator drift to calculate a process delay $T_{PROC}$ C2 120B associated with the second cluster 110B, by compensating a known process delay (KPD) of a typical cluster like C1, C2, and C3 by the determined oscillator drift (OSC DRIFT C2), for example according to equation (5) below.

$$T_{PROC} C2 = KPD +- OSC\ DRIFT\ C2 \quad (5)$$

Referring back to FIG. 4C, based on previously conducted measurements and calculations, many of the time periods 481-485 in the depicted diagram are already known by the main controller 101. For example, based on the equations (3) and (4) above, the time periods 481 ($T_{PROP}$ ISO 122) and 485 ($T_{PROP}$ ISO REPLY) are known, and can be assumed consistent across different messages, regardless of which of the clusters 110A-110C the message is addressed to. In addition, the process delay $T_{PROC}$ C2 130B of the second cluster 110B is known, for example based on equation (5) above.

The sum of time periods 482 and 484 correspond to the send and receive propagation delays $T_{PROP}$ C1+$T_{PROP}$ C1 REPLY imposed by the first cluster 110A on messages to and from the second cluster 110B. As shown in equation (6) below, the sum of the send and receive propagation delays $T_{PROP}$ C1+$T_{PROP}$ C1 REPLY may be considered equivalent to the sum of the process delay $T_{PROC}$ C2 130B and the propagation delays $T_{PROP}$ ISO 122+$T_{PROP}$ ISO REPLY subtracted from the third measured delay time 480C (TMDT). The main controller 101 may determine the propagation delay $T_{PROP}$ C1 120A based on an assumption that the propagation delays $T_{PROP}$ C1 SEND and $T_{PROP}$ C1 REPLY are substantially equal as shown by equation (7) below, as the same mechanism may be used to communicate messages to and from the main controller 101. Based on this assumption, $T_{PROP}$ C1 SEND may be considered equal to the sum of $T_{PROP}$ C1 SEND+$T_{PROP}$ C1 REPLY divided by 2, as shown in equation (8) below. As shown in equation (9), the main controller 101 may determine the propagation delay $T_{PROP}$ C1 120A (i.e., $T_{PROP}$ C1 SEND) of the first cluster 110A by subtracting the sum of the process delay $T_{PROC}$ C2 130B of the second cluster 110B and the propagation delays $T_{PROP}$ ISO 122+$T_{PROP}$ ISO REPLY from the third measured delay time (TMDT) 480C and dividing the result by 2.

$$T_{PROP} C1\ SEND + T_{PROP} C1\ REPLY = TMDT - T_{PROC} C2 - (T_{PROP}\ ISO + T_{PROP}\ ISO\ REPLY)) \quad (6)$$

$$T_{PROP} C1\ SEND == T_{PROP} C1\ REPLY \quad (7)$$

$$T_{PROP} C1\ SEND = (T_{PROP} C1\ SEND + T_{PROP} C1\ REPLY)/2 \quad (8)$$

$$T_{PROP} C1\ SEND = (TMDT - T_{PROC} C2 - (T_{PROP}\ ISO + T_{PROP}\ ISO\ REPLY))/2 \quad (9)$$

Once the main controller 101 has determined the propagation delay $T_{PROP}$ C1 120A of the first cluster 110A, the main controller 101 may use the determined propagation delay $T_{PROP}$ C1 120A to communicate messages to other clusters of the daisy chain, for example the second cluster 110B, such that are the messages are received and commands are executed by the second cluster 110B with precise timing, for example synchronously aligned with a switching clock 103 of the main controller 101, some examples of which are depicted in FIGS. 3A-3C.

The measurements of FIGS. 4A-4D are described in reference to a determining a propagation delay $T_{PROP}$ C1 120A of a first cluster 110A, which is the first of a plurality of clusters coupled in a daisy chain, closest to the main controller 101 and configured to receive messages directly from the main controller 101. In other examples, the measurements described in FIGS. 4A-4D may be applied to any cluster 110A-110C arranged at any position in a daisy chain. For example, once measurements described in FIGS. 4A and 4B are performed on the first cluster 110A, the measurements depicted in FIGS. 4C and 4D may be performed to each subsequent cluster of the daisy chain topology to determine the respective propagation delays $T_{PROP}$ and/or process delays $T_{PROC}$ associated with each cluster. As one example, the measurements of FIGS. 4C and 4D may be applied to the third cluster 110C, and used to determine a propagation delay $T_{PROP}$ C2 120B associated with the second cluster 110C. The determined propagation delays $T_{PROP}$ C1 120A and $T_{PROP}$ C2 120B may be used to send one or more messages to the third cluster 110C accounting for the propagation delays $T_{PROP}$ C1 120A and $T_{PROP}$ C2 120B, as shown for example in FIG. 3C.

The main controller 101 may generate and send messages to the clusters 110B-110C based on the determined propagation delay $T_{PROP}$ C1 120A so that the clusters 110B-110C are actuated synchronized with the switching clock 103 of the main controller 101. For example, as shown in FIGS. 3A-3C, the main controller 101 may send messages to each cluster of the daisy chain topology early enough to account for the propagation delays $T_{PROP}$ of preceding clusters in the chain, so that the recipient cluster receives the messages and actuates them synchronously. In some examples, these techniques may offer significant improvements in comparison to traditional systems used to implement multi-level converters, for example that require precise oscillators to be synchronously actuated.

Figure 5:
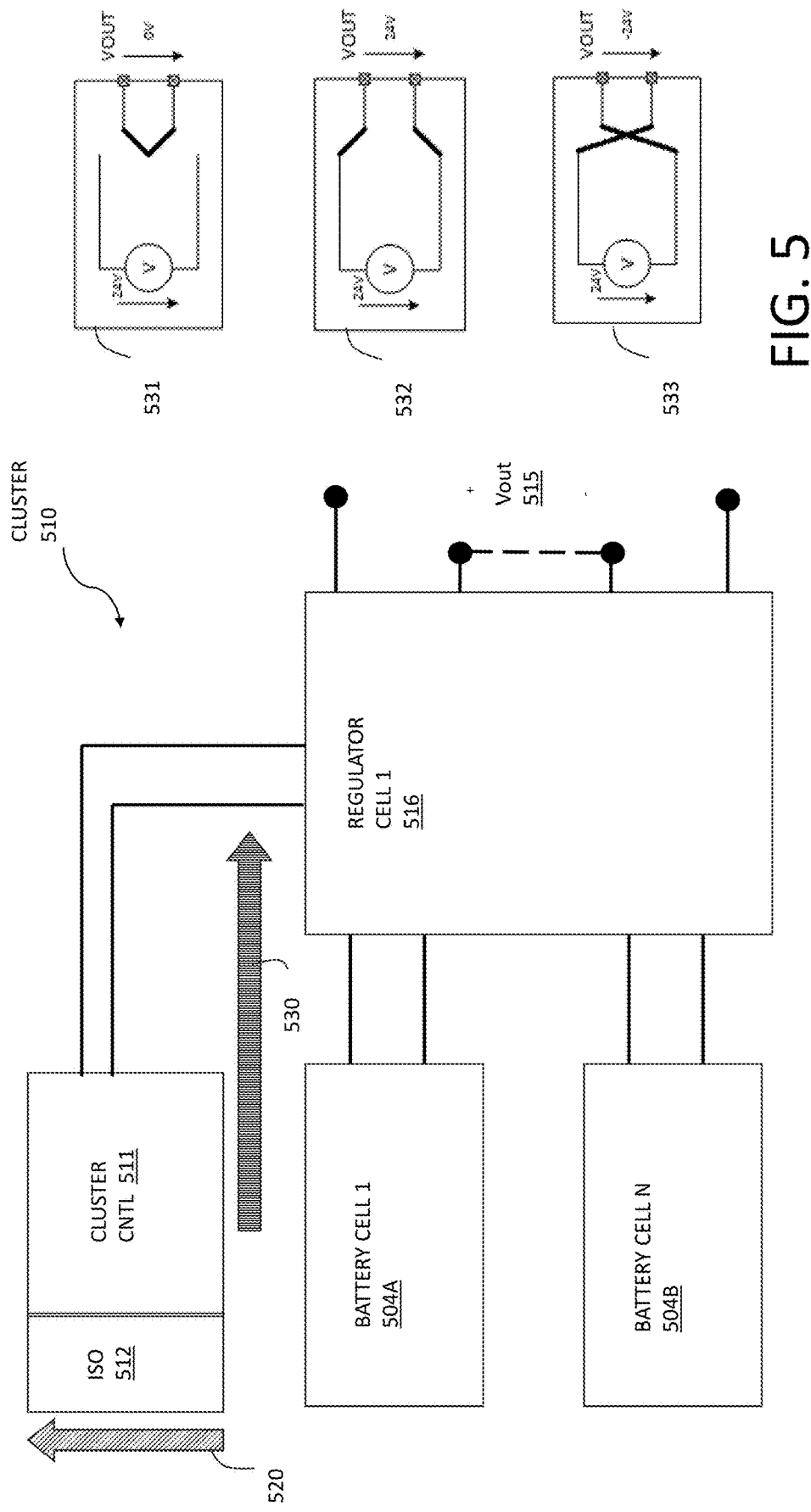
FIG. 5 is a block diagram depicting a cluster of a multi-level power converter according to some embodiments.

FIG. 5 is a block diagram depicting a cluster 510 of a multi-level power converter (e.g., system 100 depicted in FIG. 1) according to some embodiments. The cluster 510 depicted in FIG. 5 may be arranged with other clusters 110A-110C in a daisy chain topology as shown in the example of FIG. 1. As shown in FIG. 5, a cluster controller 511 is configured to communicate with a main controller (not shown in FIG. 5) through an isolation interface 512. As shown by the blocked arrow, the cluster 510 may cause a propagation delay 520 on messages directed to other clusters subsequent to cluster 510 in a daisy chain, as shown in the FIG. 1 example. A process delay 530 may also be associated with the cluster 510, which represents a delay associated with cluster 510 receiving a command, executing the command, and sending a reply message to the main controller in acknowledgement.

As shown in FIG. 5, cluster controller 511 is coupled to control one or more regulator cell(s) 516, which is coupled across terminals of multiple battery cells 504A-504B. As shown in the FIG. 5 example, the regulator cell(s) 516 are configured to output an output voltage $V_{OUT}$ at output terminals 515 of the cluster 510. As coupled, cluster controller 511 is configured to control a state of the cluster 510, by controlling the regulator cell(s) 516 to couple or decouple battery cells 504A-504B to terminals 515, to supply a portion of an output voltage to a load 105 of a multi-level converter system 100, as depicted in FIG. 1.

As shown in the example of FIG. 5, cluster controller 511 may control the regulator cell(s) 516 to generate an output voltage $V_{OUT}$ at terminals 515 with two, or three, possible discrete states, between a positive supply voltage, zero, and optionally a negative supply voltage depending on the application. In the FIG. 5 example, cluster 510 is controllable at 531 to output 0 volts, at 532 to output 24 volts, and at 533 to output −24 volts. In applications where both positive and negative voltages are required, cluster 510 may be controllable in a third distinct state 533 as shown in the FIG. 5 example. In other examples, in applications where positive and negative voltages are not required (e.g., cluster 510 works with other clusters to supply energy in a rectified stepped-sine wave) cluster 510 may only be configurable to alternate between two states 531 and 532.

In some examples, cluster 510 may be coupled to control a plurality of N regulator cells that in combination supply a maximum voltage (24V in the FIG. 5 example), 0 volts, or a minimum voltage (−24V in the FIG. 5 example) as an output voltage of the cluster 510. In some examples, the cluster 510 may control a number of regulator cells each coupled to battery cell terminals with voltage potentials that add up to the minimum and maximum voltages of the cluster. For example, a cluster switchable between 0, 24, and optionally −24 volts may be coupled to control 12 battery cells with a potential of two volts, 6 battery cells with a potential of four volts, four battery cells with a potential of 6 volts, 2 battery cells with a potential of 12 volts, or any other combination of battery cell potential and number of regulator cells arranged to supply minimum or maximum output voltages of 24 and/or −24 volts, respectively.

Figure 6:
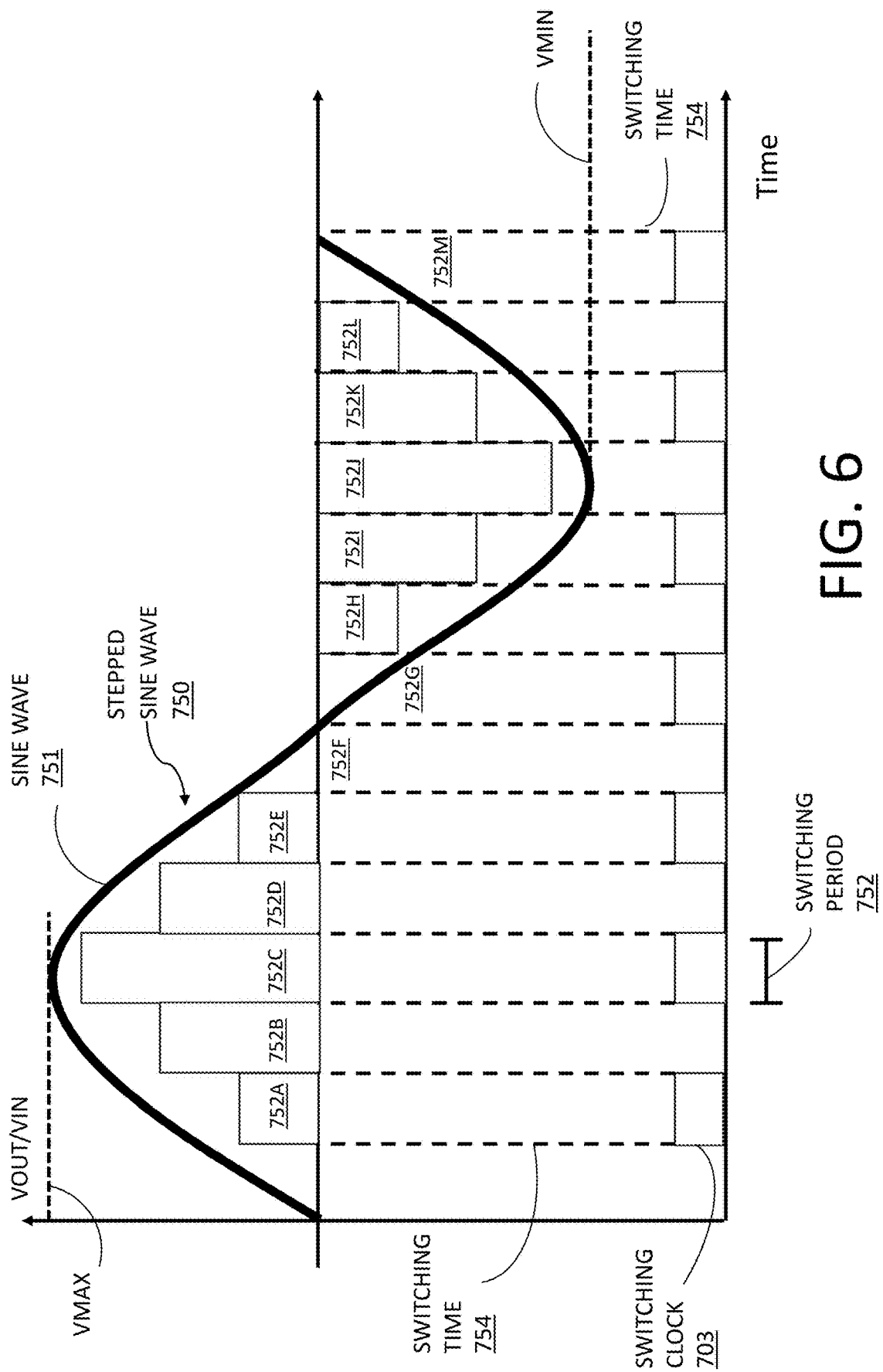
FIG. 6 depicts a simplified example of a stepped sine wave according to some embodiments.

FIG. 6 shows one example of a stepped sine wave 750 according to some embodiments. Referring back to the example of FIG. 1, in some examples, main controller 101 may be configured to control clusters 110A-110C through the daisy chain to supply energy to an AC load 105 in the form of a stepped sine wave 750 synchronized to a switching clock 703 of the main controller 101. For example, the AC load 105 may be a phase of a commutating AC motor configured to be driven by a sinusoidal energy signal. According to other examples, the AC load 105 may be an AC power grid, and the main controller 101 controls the clusters 110A-110C to convert DC energy from the DC source 104 into AC energy for supply to the AC power grid. In still other examples, the main controller 101 sends messages to actuate the clusters 110A-110C to bidirectionally couple an AC energy source (e.g., across terminal 107) into DC energy to charge a DC source 104, such as cells of a battery.

FIG. 6 depicts a simplified example of a stepped sine wave according to some embodiments. According to the example of FIG. 6, a multi-level converter 100 as depicted in FIG. 1 includes three clusters 110A-110C coupled in a daisy chain. Each of the clusters 110A-110C is individually controllable by the main controller 101 to in three distinct states to supply a portion of a multi-level output voltage (represented by the vertical axis in FIG. 1, relative to time on the horizontal axis) to a load 105. Referring to the example of FIG. 6, each of the three clusters 110A-110C may be switchable between 24, 0, and −24 volts, as shown in the example of FIG. 5.

FIG. 6 shows a simplified example of a sine wave that ranges from maximum voltage Vmax of roughly 72 volts to a minimum voltage Vmin of roughly −72 volts. As shown in FIG. 6, to approximate the sine wave 751, the main controller 101 actuates the clusters 110A-110C to change the output voltage at switching times 754 defined based on a switching clock 103 of the main controller 101. The switching times 754 are separated from one another by a switching period 752, which correspond to each segment of the stepped sine wave 750.

Referring again to FIG. 6, in a first switching period 752A, the main controller 101 actuates one of the three clusters 110A-110C to supply 24 volts to the terminal 107, while the other two clusters supply 0 volts, such that 24 volts in total are output to the terminal 107. In a second switching period 752B, the main controller 101 actuates a second of the three clusters 110A-110C to supply another 24 volts to the terminal 107 while the remaining cluster supplies zero volts, such that 48 volts in total are supplied to the terminal 107. In a third switching period 752C, the main controller 101 actuates all three clusters 110A-110C to supply 24 volts to the terminal 107, such that 72 volts in total are supplied to the terminal 107. In a fourth switching period 752D, the main controller 101 actuates one of the three clusters 110A-110C to supply zero volts instead of 24 volts, while the other two clusters supply 24 volts, such that 48 volts in total are supplied to the terminal 107. In a fifth switching period 752E, the main controller 101 actuates another of the three clusters 110A-110C to supply zero volts, while one cluster still supplies 24 volts, such that 48 volts in total are supplied to the terminal 107. In sixth and seventh switching periods 752F, 752G the main controller 101 actuates the remaining cluster to supply 0 volts, such that 0 volts in total are supplied to the terminal 107. As shown in FIG. 6, in switching periods 752H-7752M the main controller 101 continues to actuate the clusters 110A-110C to output 0, −24, −48, −72, −48, and −24 volts, respectively, to similarly approximate the negative portion of the sine wave 751.

Figure 7:
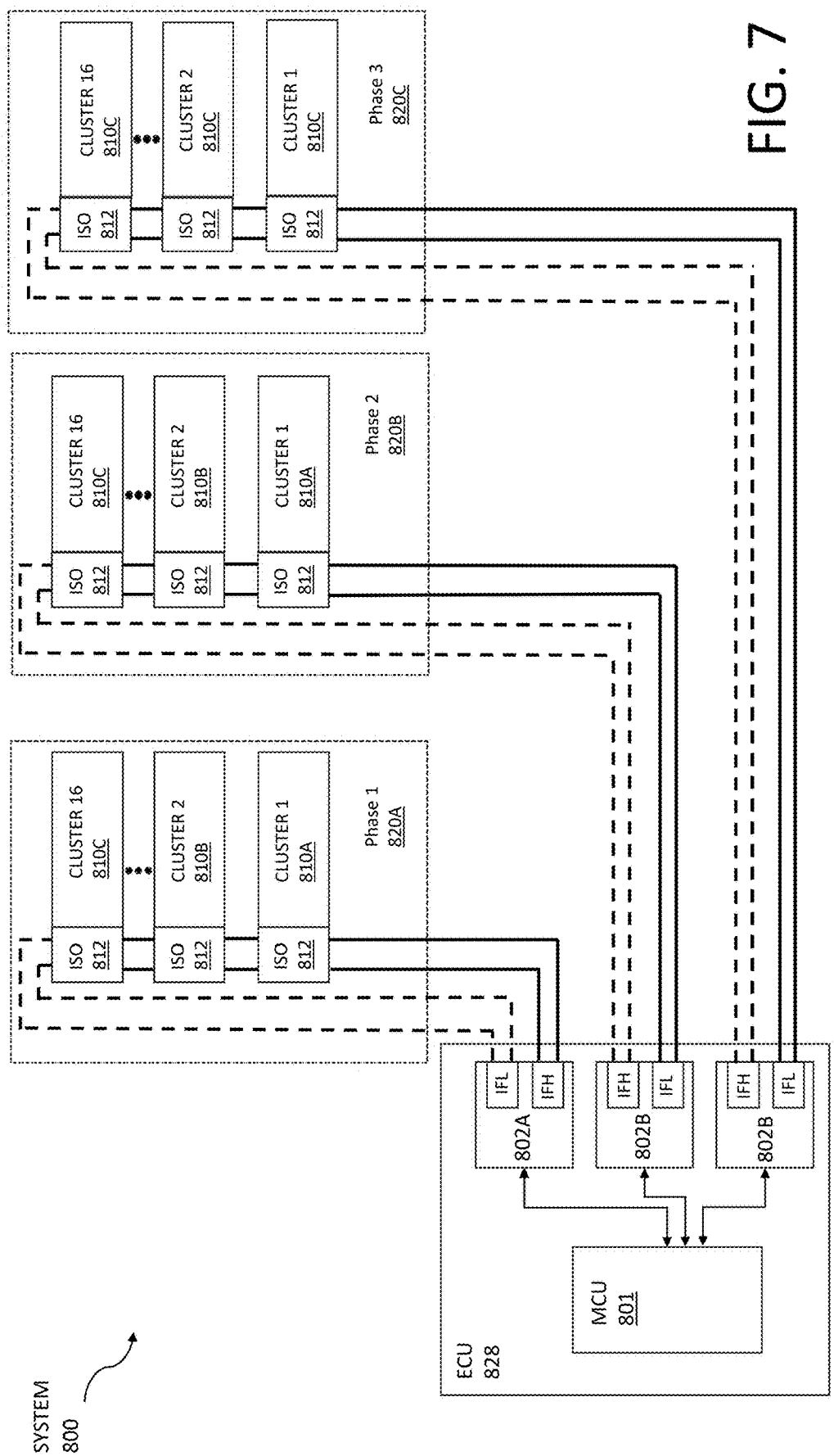
FIG. 7 is a system diagram that depicts one example of multi-level converter system that may be used to supply energy in the form of a stepped sinusoidal waveform to a three-phase AC motor.

FIG. 7 is a system diagram that depicts one example of multi-level converter system 800 that may be used to supply energy in the form of a stepped sinusoidal waveform to a three-phase AC motor. As shown in FIG. 7, the system 800 includes an electronic control unit 828 that includes a main controller 801 (e.g., a microcontroller) and a three isolation interfaces 802A-802C, each of which is coupled to control a respective phase 820A, 820B, 820C to supply energy to a phase of a three-phase AC motor.

As shown in FIG. 7, each phase 820A-820C includes 16 clusters 810A-810C, each of which are coupled in a daisy chain through isolation interfaces 812 and actuatable by the main controller 801 in one of three states, to couple 24, 0, or −24V to an output (not shown) coupled to drive each phase. According to this example, the main controller 801 is configured to actuate the clusters 810A-810C to supply energy with a stepped sinusoidal waveform that ranges from a maximum voltage of 384 volts to a minimum voltage of around −384 volts, or a range of around 800 volts (768 volts). According to this example, the main controller 801 is part of an electronic control unit (ECU) of a vehicle, which may include other components associated with vehicle electrical systems.

As shown in FIG. 7, in an optional embodiment, the clusters 810A-810C may be coupled in a daisy chain in loop topology, in which an last cluster (16$^{th}$ cluster 810C) in the daisy chain is coupled in an optional return path (as shown by the dashed lines in FIG. 8) to the main controller 101, and the clusters 810A-810C are configured to send replies to the main controller 801 through the other clusters in 810A-810C that precede the cluster in the daisy chain, or through the optional return path.

In some examples, the isolation interfaces 812 of each cluster are substantially similar to one another, for example the isolation interface may be interchangeable components. In some examples, the isolation interfaces 802A-802C are substantially similar to one another as well, and may also be interchangeable components. In some examples, the isolation interface 802A-802C are substantial similar to isolation interfaces 812 of each cluster 110A-110C, and are components interchangeable with isolation interfaces 812.

According to the example of FIG. 7, each phase 820A-820C of 16 clusters 810A-810C may be coupled to a respective phase of an AC load 105 such as an AC motor, and used to drive each phase with a stepped approximation of a sinusoidal waveform phase-shifted relative to the other phrases. In some examples, propagation delays of the 16 daisy-chain coupled clusters 810A-810C in each phase may impact main controller 801 to synchronize actuation of the respective clusters of each phase to drive the AC motor. Accordingly, main controller 801 perform measurements to identify propagation delays $T_{PROP}$ and/or process delays $T_{PROC}$ associated with the 16 clusters 810A-810C of each phase, and control timing of messages and/or execution of commands that actuate the clusters 610A-610C to accommodate for the propagation delays $T_{PROP}$ and/or process delays $T_{PROC}$ such that system 800 drives the AC motor efficiently at fast speeds, without incorporating a costly precision oscillator for each cluster 810A-810C synchronized to the main controller 801.

Figure 8:
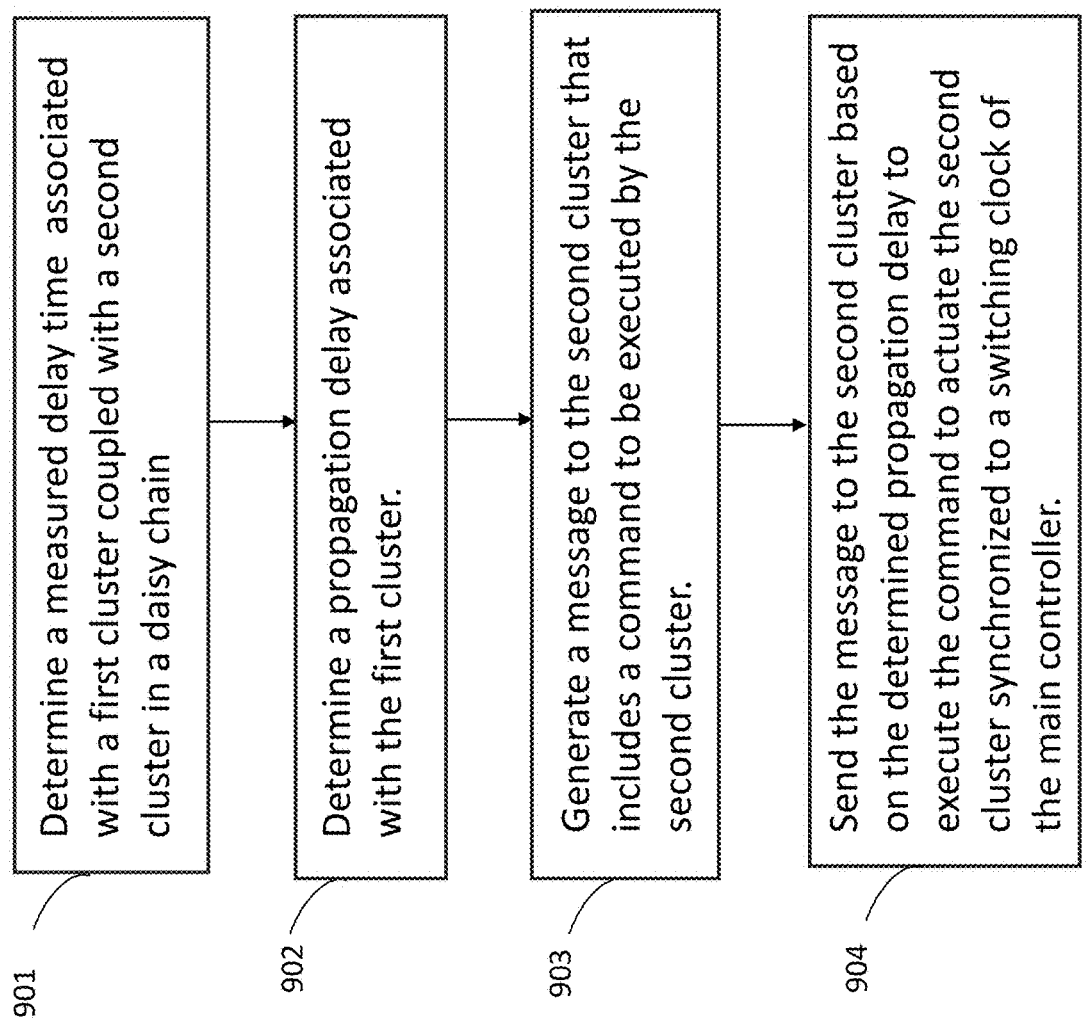
FIG. 8 is a flow chart that depicts one example of a method of operating a main controller according to some embodiments.

FIG. 8 is a flow chart that depicts one example of a method of operating a main controller (e.g., 101) according to some embodiments. As shown in FIG. 8, at step 901, the method includes determining, by a main controller (e.g., 101), a measured delay time associated with a first cluster (e.g., 110A) coupled with a second cluster (e.g., 110B) in a daisy chain such that the main controller communicates with the second cluster through an isolated interface (e.g., 112A) of the first cluster. As shown in FIG. 8, at step 902, the method includes determining, by the main controller and based on the measured delay time, a propagation delay (e.g., $T_{PROP}$ C1 120A) associated with the first cluster. In some examples, the propagation delay associated with first cluster represents a delay introduced by the first cluster on messages from the main controller to at least the second cluster.

As shown in FIG. 8, at step 903, the method includes generating, by the main controller, a message to the second cluster which includes a command to be executed by the second cluster. As shown in FIG. 8, at step 904, the method includes sending, by the main controller through an isolation interface (e.g., 102) of the main controller, the message to the second cluster based on the determined propagation delay to execute the command to actuate the second cluster synchronized to a switching clock (e.g., 103) of the main controller. In some examples, the command actuates the second cluster to supply a portion of an output voltage to a load. In some examples, the method further includes sending the message to the second cluster early enough to accommodate the propagation delay associated with the first cluster. In some examples, the switching clock has a switching period, and the switching period corresponds to discrete segments of a stepped sine-wave.

In some examples, the first and second clusters are arranged in the daisy chain with at least a third cluster (e.g., 110C) such that the main controller communicates with the third cluster through isolation interfaces (e.g., 112A, 112B) of the first and second clusters. According to these examples, the measured delay time is a first measured delay time (e.g., 480A), the propagation delay is a first propagation delay (e.g., $T_{PROP}$ C1 120A) and the method further determining, by the main controller, a second propagation delay (e.g., $T_{PROP}$ C2 120B) associated with the second cluster.

In some examples, the method further includes generating, by the main controller, a second message to the third cluster which includes a second command to be executed by the third cluster, and sending, by the main controller through the isolation interface of the main controller, the second message to the third cluster to execute the second command based on the determined second propagation delay synchronized to the switching clock of the main controller by sending the second message early enough to accommodate the first propagation delay and the second propagation delay.

In some examples, determining the measured delay time (e.g., 480A) associated with the first cluster includes sending a test message to the first cluster, receiving a reply message from the first cluster, and measuring a time difference between outputting the test message and receiving the reply message. In some examples, the test message is a first test message (e.g., 470A), the reply message is a first reply message (e.g., 478A), and the time difference is a first time difference, and the method further includes determining a second measured delay time (e.g., 480B), including sending a second test message (e.g., 470B) to the first cluster with a known delay (e.g., 479), receiving a second reply message (e.g., 478B) delayed by the known delay, and measuring a second time difference between outputting the second test message and receiving the second reply message. In some examples, the method further includes using the first time difference and the second time difference to determine an oscillator drift associated with the first cluster, and using the determined oscillator drift to determine a process delay (e.g., $T_{PROC}$ C1 130A) associated with the first cluster. In some examples, the method further includes determining a measured delay time associated with the second cluster, including determining a third measured delay time (e.g., 480C), including sending a third test message (e.g., 470B) to the second cluster, receiving a third reply message (e.g., 488A) from the second cluster, and measuring a third time difference between sending the third test message and receiving the third reply message. In some examples, the method further includes determining a fourth measured delay time (e.g., 480D), including sending a fourth test message (e.g., 470D) to the second cluster with a known delay (e.g., 479), receiving a fourth reply message (e.g., 488B) from the second cluster, and measuring a fourth time difference between sending the fourth test message and receiving the fourth reply message.

In some examples, the method further includes using the third time difference and the fourth time difference to determine an oscillator drift associated with the second cluster; and using the determined oscillator drift to determine a process delay (e.g., $T_{PROC}C2$ 130B) associated with the second cluster. In some examples, the method further includes using the process delay associated with the second cluster to determine the propagation delay associated with the first cluster. In some examples, the method further includes sending a message to the second cluster to supply respective portions of an output voltage to a load (e.g., 105), and the load includes one or more loads selected from the group consisting of: a battery, an electrical grid, and a phase of an Alternating Current (AC) motor. In some examples, the method includes sending a message to the second cluster to couple a Direct Current (DC) energy source (e.g., 104) to an Alternating Current (AC) load (e.g., 105), or to couple an AC energy source to a DC load.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

DISCUSSION OF POSSIBLE EMBODIMENTS

The following are non-exclusive descriptions of possible embodiments of the present invention.

According to one example, in some aspects, a method is described. The method includes determining, by a main controller, a measured delay time associated with a first cluster coupled with a second cluster in a daisy chain such that the main controller communicates with the second cluster through an isolated interface of the first cluster. The method further includes determining, by the main controller and based on the measured delay time, a propagation delay associated with the first cluster. The method further includes generating, by the main controller, a message to the second cluster which includes a command to be executed by the second cluster. The method further includes sending, by the main controller through an isolation interface of the main controller, the message to the second cluster based on the determined propagation delay to execute the command to actuate the second cluster synchronized to a switching clock of the main controller.

The method of the preceding paragraph may optionally include, additionally and/or alternatively, any one or more of the following features, configurations and/or additional steps alone or in combination with one another.

According to one example, in some aspects, the propagation delay associated with first cluster represents a delay introduced by the first cluster on messages from the main controller to at least the second cluster. According to another example, in some aspects, the command actuates the second cluster to supply a portion of an output voltage to a load. According to another example, in some aspects, the method further includes sending the message to the second cluster early enough to accommodate the propagation delay associated with the first cluster. According to another example, in some aspects, the switching clock has a switching period, and the switching period corresponds to discrete segments of a stepped sine-wave.

According to another example, in some aspects, the first and second clusters are arranged in the daisy chain with at least a third cluster such that the main controller communicates with the third cluster through isolation interfaces of the first and second clusters. According to another example, in some aspects, the propagation delay is a first propagation delay and the method further includes determining, by the main controller, a second propagation delay associated with the second cluster. According to another example, in some aspects, the method further includes generating, by the main controller, a second message to the third cluster which includes a second command to be executed by the third cluster, and sending, by the main controller through the isolation interface of the main controller, the second message to the third cluster to execute the second command based on the determined second propagation delay synchronized to the switching clock of the main controller by sending the second message early enough to accommodate the first propagation delay and the second propagation delay.

According to another example, in some aspects, determining the measured delay time associated with the first cluster includes sending a test message to the first cluster, receiving a reply message from the first cluster, and measuring a time difference between outputting the test message and receiving the reply message. According to another example, in some aspects, the test message is a first test message, the reply message is a first reply message, and the time difference is a first time difference, and the method further includes determining a second measured delay time, including sending a second test message to the first cluster with a known delay, receiving a second reply message delayed by the known delay, and measuring a second time difference between outputting the second test message and receiving the second reply message. According to another example, in some aspects, the method further includes using the first time difference and the second time difference to determine one or more of an oscillator drift associated with the first cluster, and using the determined oscillator drift to determine a process delay associated with the first cluster. According to another example, in some aspects, the method further includes determining a third measured delay time, including sending a third test message to the second cluster, receiving a third reply message from the second cluster, and measuring a third time difference between sending the third test message and receiving the third reply message. According to another example, in some aspects, the method further includes determining a fourth measured delay time, including sending a fourth test message to the second cluster with a known delay, receiving a fourth reply message from the second cluster, and measuring a fourth time difference between sending the fourth test message and receiving the fourth reply message.

According to another example, in some aspects, the method further includes using the third time difference and the fourth time difference to determine an oscillator drift associated with the second cluster; and using the determined oscillator drift to determine a process delay associated with the second cluster. According to another example, in some aspects, the method further includes using the process delay associated with the second cluster to determine the propagation delay associated with the first cluster. According to another example, in some aspects, the method includes sending the message to the second cluster to supply respective portions of an output voltage to a load, and the load includes one or more loads selected from a group consisting of: a battery, an electrical grid, and a phase of an Alternating Current (AC) motor. According to another example, in some aspects, the method includes sending the message to the second cluster to couple a Direct Current (DC) energy source to an Alternating Current (AC) load, or to couple an AC energy source to a DC load.

According to one example, in some aspects, an electronic control unit (ECU) is described. The ECU includes a main controller configured to determine a measured delay time associated with a first cluster coupled with a second cluster in a daisy chain such that the main controller communicates with the second cluster through an isolated interface of the first cluster. The main controller is further configured to determine, based on the measured delay time, a propagation delay associated with the first cluster. The main controller is further configured to generate a message to the second cluster which includes a command to be executed by the second cluster. The main controller is further configured to send, through an isolation interface of the main controller, the message to the second cluster based on the determined propagation delay to execute the command to actuate the second cluster synchronized to a switching clock of the main controller.

The ECU of the preceding paragraph may optionally include, additionally and/or alternatively, any one or more of the following features, configurations and/or additional components alone or in combination with one another.

According to one example, in some aspects, the command actuates the second cluster to supply a portion of an output voltage to a load. According to another example, in some aspects, the propagation delay associated with first cluster represents a delay introduced by the first cluster on messages from the main controller to at least the second cluster. According to another example, in some aspects, the main controller is configured to send the message to the second cluster early enough to accommodate the propagation delay associated with the first cluster. According to another example, in some aspects, the switching clock has a switching period, and the switching period corresponds to discrete segments of a stepped sine-wave.

According to another example, in some aspects, the main controller is further configured to: send, through the isolation interface of the main controller, other messages to other clusters of the daisy chain to be executed by the other clusters synchronously with the switching clock. According to another example, in some aspects, the first and second clusters are arranged in the daisy chain with at least a third cluster such that the main controller communicates with the third cluster through isolation interfaces of the first and second clusters, the propagation delay is a first propagation delay and the main controller is further configured to: determine a second propagation delay associated with the second cluster. According to another example, in some aspects, the main controller is configured to generate, by the main controller, a second message to the third cluster which includes a second command to be executed by the third cluster. According to another example, in some aspects, the main controller is configured to send, through the isolation interface of the main controller, the second message to the third cluster to execute the second command based on the determined second propagation delay synchronized to the switching clock of the main controller by sending the second message early enough to accommodate the first propagation delay and the second propagation delay. According to another example, in some aspects, the main controller is further configured to: send a test message to the first cluster, receive a reply message from the first cluster, and measure a time difference between outputting the test message and receiving the reply message. According to another example, in some aspects, the test message is a first test message, the reply message is a first reply message, and the time difference is a first time difference, and the main controller is further configured to send a second test message to the first cluster with a known delay, receive a second reply message delayed by the known delay, and measure a second time difference between outputting the second test message and receiving the second reply message. According to another example, in some aspects, the main controller is further configured to use the first time difference and the second time difference to determine an oscillator drift associated with the first cluster, and use the determined oscillator drift to determine a process delay associated with the first cluster. According to another example, in some aspects, the main controller is further configured to send a third test message to the second cluster, receive a third reply message from the second cluster, and measure a third time difference between sending the third test message and receiving the third reply message. According to another example, in some aspects, the main controller is further configured to send a fourth test message to the second cluster with a known delay, receive a fourth reply message from the second cluster, measure a fourth time difference between sending the fourth test message and receiving the fourth reply message. According to another example, in some aspects, the main controller is further configured to use the third time difference and the fourth time difference to determine an oscillator drift associated with the second cluster, and use the determined oscillator drift to determine a process delay associated with the second cluster. According to another example, in some aspects, the main controller is further configured to use the process delay associated with the second cluster to determine the propagation delay associated with the first cluster. According to another example, in some aspects, the main controller is configured to send the message to the second cluster to supply energy to a load, wherein the load comprises one or more loads selected from a group consisting of: a battery, an electrical grid, and a phase of an Alternating Current (AC) motor. According to another example, in some aspects, the main controller is configured to send the message to the second cluster to couple a Direct Current (DC) energy source to an Alternating Current (AC) load, or to couple an AC energy source to a DC load.

According to another aspect, a system is described. The system includes a main controller and a plurality of clusters including at least a first cluster coupled with a second cluster in a daisy chain such that the main controller communicates with the second cluster through an electrically isolated interface of the first cluster. The main controller is configured to determine a measured delay time associated with a first cluster. The main controller is further configured to determine, based on the measured delay time, a propagation delay associated with the first cluster. The main controller is further configured to generate a message to the second cluster which includes a command to be executed by the second cluster. The main controller is further configured to send, through an isolation interface of the main controller, the message to the second cluster based on the determined propagation delay to execute the command to actuate the second cluster synchronized to a switching clock of the main controller.

The system of the preceding paragraph may optionally include, additionally and/or alternatively, any one or more of the following features, configurations and/or additional components alone or in combination with one another.

According to one example, in some aspects, the command actuates the second cluster to supply a portion of an output voltage to a load. According to another example, in some aspects, the propagation delay associated with first cluster represents a delay introduced by the first cluster on messages from the main controller to at least the second cluster. According to another example, in some aspects, the main controller is configured to send the message to the second cluster early enough to accommodate the propagation delay associated with the first cluster. According to another example, in some aspects, the switching clock has a switching period, and the switching period corresponds to discrete segments of a stepped sine-wave. According to another example, in some aspects, the main controller is further configured to send, through the isolation interface of the main controller, other messages to other clusters of the daisy chain to be executed by the other clusters synchronously with the switching clock. According to another example, in some aspects, the first and second clusters are arranged in the daisy chain with at least a third cluster such that the main controller communicates with the third cluster through isolation interfaces of the first and second clusters, the propagation delay is a first propagation delay and the main controller is further configured to determine a second measured delay time associated with the second cluster. According to another example, in some aspects, the main controller is further configured to determine a second propagation delay associated with the second cluster. According to another example, in some aspects, the main controller is further configured to generate, by the main controller, a second message to the third cluster which includes a second command to be executed by the third cluster. According to another example, in some aspects, the main controller is further configured to send, through the isolation interface of the main controller, the second message to the third cluster to execute the second command based on the determined second propagation delay synchronized to the switching clock of the main controller by sending the second message early enough to accommodate the first propagation delay and the second propagation delay. According to another example, in some aspects, the main controller is further configured to send a test message to the first cluster, receive a reply message from the first cluster, and measure a time difference between outputting the test message and receiving the reply message. According to another example, in some aspects, the test message is a first test message, the reply message is a first reply message, and the time difference is a first time difference, and the main controller is further configured to send a second test message to the first cluster with a known delay, receive a second reply message delayed by the known delay, and measure a second time difference between outputting the second test message and receiving the second reply message. According to another example, in some aspects, the main controller is further configured to use the first time difference and the second time difference to determine an oscillator drift associated with the first cluster, and use the determined oscillator drift to determine a process delay associated with the first cluster. According to another example, in some aspects, the main controller is further configured to send a third test message to the second cluster, receive a third reply message from the second cluster, and measure a third time difference between sending the third test message and receiving the third reply message. According to another example, in some aspects, the main controller is further configured to send a fourth test message to the second cluster with a known delay, receive a fourth reply message from the second cluster, measure a fourth time difference between sending the fourth test message and receiving the fourth reply message. According to another example, in some aspects, the main controller is further configured to use the third time difference and the fourth time difference to determine an oscillator drift associated with the second cluster, and use the determined oscillator drift to determine a process delay associated with the second cluster. According to another example, in some aspects, the main controller is further configured to use the process delay associated with the second cluster to determine the propagation delay associated with the first cluster. According to another example, in some aspects, the main controller is configured to send the message to the second cluster to supply energy to a load, wherein the load comprises one or more loads selected from a group consisting of: a battery, an electrical grid, and a phase of an Alternating Current (AC) motor. According to another example, in some aspects, the main controller is configured to send the message to the second cluster to couple a Direct Current (DC) energy source to an Alternating Current (AC) load, or to couple an AC energy source to a DC load.

We claim:

1. A method comprising:
   determining, by a main controller, measured delay time associated with a first cluster, the first cluster coupled with a second cluster in a daisy chain in a manner that the main controller communicates with the second cluster through an isolated interface of the first cluster;
   determining, by the main controller and based on the measured delay time, a propagation delay associated with the first cluster;
   generating, by the main controller, a message to the second cluster which includes a command to be executed by the second cluster; and
   sending, by the main controller through an isolation interface of the main controller, the message to the second cluster based on the determined propagation delay to execute the command to actuate the second cluster synchronized to a switching clock of the main controller.

2. The method of claim 1, wherein the command actuates the second cluster to supply a portion of an output voltage to a load.

3. The method of claim 1, wherein the propagation delay associated with first cluster represents a delay introduced by the first cluster on messages from the main controller to at least the second cluster.

4. The method of claim 1, wherein sending the message to the second cluster to be executed by the second cluster based on the determined propagation delay comprises:
   sending the message to the second cluster early enough to accommodate the propagation delay associated with the first cluster.

5. The method of claim 4, wherein the switching clock has a switching period, and the switching period corresponds to discrete segments of a stepped sine-wave.

6. The method of claim 5, further comprising:
   sending, by the main controller through the isolation interface of the main controller, other messages to other clusters of the daisy chain to be executed by the other clusters synchronously with the switching clock.

7. The method of claim 1, wherein the first and second clusters are arranged in the daisy chain with at least a third cluster in a manner that the main controller communicates with the third cluster through isolation interfaces of the first and second clusters, wherein the propagation delay is a first propagation delay and the method further comprising:
  determining, by the main controller, a second propagation delay associated with the second cluster;
  generating, by the main controller, a second message to the third cluster which includes a second command to be executed by the third cluster; and
  sending, by the main controller through the isolation interface of the main controller, the second message to the third cluster to execute the second command based on the determined second propagation delay associated with the second cluster synchronized to the switching clock of the main controller by sending the second message early enough to accommodate the first propagation delay and the second propagation delay.

8. The method of claim 1, wherein determining the measured delay time associated with the first cluster includes:
  sending a test message to the first cluster;
  receiving a reply message from the first cluster; and
  measuring a time difference between outputting the test message and receiving the reply message.

9. The method of claim 8, wherein the test message is a first test message, the reply message is a first reply message, and the time difference is a first time difference, and the method further comprising determining a second measured delay time, comprising:
  sending a second test message to the first cluster with a known delay;
  receiving a second reply message delayed by the known delay; and
  measuring a second time difference between outputting the second test message and receiving the second reply message.

10. The method of claim 9, further comprising:
  utilizing the first time difference and the second time difference to determine an oscillator drift associated with the first cluster; and
  utilizing the determined oscillator drift to determine a process delay associated with the first cluster.

11. The method of claim 10, further comprising determining a third measured delay time, comprising:
  sending a third test message to the second cluster;
  receiving a third reply message from the second cluster; and
  measuring a third time difference between sending the third test message and receiving the third reply message.

12. The method of claim 11, further comprising determining a fourth measured time delay, comprising:
  sending a fourth test message to the second cluster with a known delay;
  receiving a fourth reply message from the second cluster; and
  measuring a fourth time difference between sending the fourth test message and receiving the fourth reply message.

13. The method of claim 12, further comprising:
  utilizing the third time difference and the fourth time difference to determine an oscillator drift associated with the second cluster; and
  utilizing the determined oscillator drift to determine a process delay associated with the second cluster.

14. The method of claim 13, further comprising:
  utilizing the process delay associated with the second cluster to determine the propagation delay associated with the first cluster.

15. The method of claim 1, further comprising:
  sending the message to the second cluster to supply energy to a load, wherein the load comprises one or more loads selected from a group consisting of:
  a battery;
  an electrical grid; and
  a phase of an Alternating Current (AC) motor.

16. The method of claim 1, further comprising:
  sending the message to the second cluster to couple a Direct Current (DC) energy source to an Alternating Current (AC) load, or to couple an AC energy source to a DC load.

17. An electronic control unit (ECU) comprising:
  a main controller configured to:
    determine a measured delay time associated with a first cluster, the first cluster coupled with a second cluster in a daisy chain in a manner that the main controller communicates with the second cluster through an isolated interface of the first cluster;
    determine, based on the measured delay time, a propagation delay associated with the first cluster;
    generate a message to the second cluster which includes a command to be executed by the second cluster; and
    send, through an isolation interface of the main controller, the message to the second cluster based on the determined propagation delay to execute the command to actuate the second cluster synchronized to a switching clock of the main controller.

18. The ECU of claim 17, wherein the command actuates the second cluster to supply a portion of an output voltage to a load.

19. The ECU of claim 17, wherein the propagation delay associated with first cluster represents a delay introduced by the first cluster on messages from the main controller to at least the second cluster.

20. The ECU of claim 17, wherein the main controller is configured to send the message to the second cluster early enough to accommodate the propagation delay associated with the first cluster.

21. The ECU of claim 20, wherein the switching clock has a switching period, and the switching period corresponds to discrete segments of a stepped sin-wave.

22. The ECU of claim 21, wherein the main controller is further configured to:
  send, through the isolation interface of the main controller, other messages to other clusters of the daisy chain to be executed by the other clusters synchronously with the switching clock.

23. The ECU of claim 17, wherein the first and second clusters are arranged in the daisy chain with at least a third cluster in a manner that the main controller communicates with the third cluster through isolation interfaces of the first and second clusters, wherein the propagation delay is a first propagation delay and wherein the main controller is further configured to:
  determine a second propagation delay associated with the second cluster;
  generate a second message to the third cluster which includes a second command to be executed by the third cluster; and
  send, through the isolation interface of the main controller, the second message to the third cluster to execute the second command based on the determined second propagation delay synchronized to the switching clock of the main controller by sending the second message early enough to accommodate the first propagation delay and the second propagation delay.

24. The ECU of claim 17, wherein the main controller is further configured to:
send a test message to the first cluster;
receive a reply message from the first cluster; and
measure a time difference between outputting the test message and receiving the reply message.

25. The ECU of claim 24, wherein the test message is a first test message, the reply message is a first reply message, and the time difference is a first time difference, and wherein the main controller is further configured to:
send a second test message to the first cluster with a known delay;
receive a second reply message delayed by the known delay; and
measure a second time difference between outputting the second test message and receiving the second reply message.

26. The ECU of claim 25, wherein the main controller is further configured to:
utilize the first time difference and the second time difference to determine an oscillator drift associated with the first cluster; and
utilize the determined oscillator drift to determine a process delay associated with the first cluster.

27. The ECU of claim 26, wherein the main controller is further configured to:
send a third test message to the second cluster;
receive a third reply message from the second cluster; and
measure a third time difference between sending the third test message and receiving the third reply message.

28. The ECU of claim 27, wherein the main controller is further configured to:
send a fourth test message to the second cluster with a known delay;
receive a fourth reply message from the second cluster; and
measure a fourth time difference between sending the fourth test message and receiving the fourth reply message.

29. The ECU of claim 28, wherein the main controller is further configured to:
utilize the third time difference and the fourth time difference to determine an oscillator drift associated with the second cluster; and
utilize the determined oscillator drift to determine a process delay associated with the second cluster.

30. The ECU of claim 29, wherein the main controller is further configured to:
utilize the process delay associated with the second cluster to determine the propagation delay associated with the first cluster.

31. The ECU of claim 17, wherein the main controller is configured to send the message to the second cluster to supply energy to a load, wherein the load comprises one or more loads selected from a group consisting of:
a battery;
an electrical grid; and
a phase of an Alternating Current (AC) motor.

32. The ECU of claim 17, wherein the main controller is configured to send the message to the second cluster to couple a Direct Current (DC) energy source to an Alternating Current (AC) load, or to couple an AC energy source to a DC load.

33. A system comprising:
a main controller; and
a plurality of clusters including at least a first cluster coupled with a second cluster in a daisy chain in a manner that the main controller communicates with the second cluster through an electrically isolated interface of the first cluster;
wherein the main controller is configured to:
determine a measured delay time associated with the first cluster;
determine, based on the measured delay time, a propagation delay associated with the first cluster;
generate a message to the second cluster which includes a command to be executed by the second cluster; and
send, through an isolation interface of the main controller, the message to the second cluster based on the determined propagation delay to execute the command to actuate the second cluster synchronized to a switching clock of the main controller.

34. The system of claim 33, wherein the command actuates the second cluster to supply a portion of an output voltage to a load.

35. The system of claim 33, wherein the propagation delay associated with first cluster represents a delay introduced by the first cluster on messages from the main controller to at least the second cluster.

36. The system of claim 33, wherein the main controller is configured to send the message to the second cluster early enough to accommodate the propagation delay associated with the first cluster.

37. The system of claim 36, wherein the switching clock has a switching period, and the switching period corresponds to discrete segments of a stepped sine-wave.

38. The system of claim 37, wherein the main controller is further configured to:
send, through the isolation interface of the main controller, other messages to other clusters of the daisy chain to be executed by the other clusters synchronously with the switching clock.

39. The system of claim 33, wherein the first and second clusters are arranged in the daisy chain with at least a third cluster in a manner that the main controller communicates with the third cluster through isolation interfaces of the first and second clusters, wherein the propagation delay is a first propagation delay and wherein the main controller is further configured to:
determine a second propagation delay associated with the second cluster;
generate a second message to the third cluster which includes a second command to be executed by the third cluster; and
send, through the isolation interface of the main controller, the second message to the third cluster to execute the second command based on the determined second propagation delay synchronized to the switching clock of the main controller by sending the second message early enough to accommodate the first propagation delay and the second propagation delay.

40. The system of claim 33, wherein the main controller is further configured to:
- send a test message to the first cluster;
- receive a reply message from the first cluster; and
- measure a time difference between outputting the test message and receiving the reply message.

41. The system of claim 40, wherein the test message is a first test message, the reply message is a first reply message, and the time difference is a first time difference, and wherein the main controller is further configured to:
- send a second test message to the first cluster with a known delay;
- receive a second reply message delayed by the known delay; and
- measure a second time difference between outputting the second test message and receiving the second reply message.

42. The system of claim 41, wherein the main controller is further configured to:
- utilize the first time difference and the second time difference to determine an oscillator drift associated with the first cluster; and
- utilize the determined oscillator drift to determine a process delay associated with the first cluster.

43. The system of claim 42, wherein the main controller is further configured to:
- send a third test message to the second cluster;
- receive a third reply message from the second cluster; and
- measure a third time difference between sending the third test message and receiving the third reply message.

44. The system of claim 43, wherein the main controller is further configured to:
- send a fourth test message to the second cluster with a known delay;
- receive a fourth reply message from the second cluster; and
- measure a fourth time difference between sending the fourth test message and receiving the fourth reply message.

45. The system of claim 44, wherein the main controller is further configured to:
- utilize the third time difference and the fourth time difference to determine an oscillator drift associated with the second cluster; and
- utilize the determined oscillator drift to determine a process delay associated with the second cluster.

46. The system of claim 45, wherein the main controller is further configured to:
- utilize the process delay associated with the second cluster to determine the propagation delay associated with the first cluster.

47. The system of claim 33, wherein the main controller is configured to send the message to the second cluster to supply energy to a load, wherein the load comprises one or more loads selected from a group consisting of:
- a battery;
- an electrical grid; and
- a phase of an Alternating Current (AC) motor.

48. The system of claim 33, wherein the main controller is configured to send the message to the second cluster to couple a Direct Current (DC) energy source to an Alternating Current (AC) load, or to couple an AC energy source to a DC load.

\* \* \* \* \*